United States Patent
Hirose

(10) Patent No.: US 6,539,109 B1
(45) Date of Patent: Mar. 25, 2003

(54) IMAGING SYSTEM

(75) Inventor: Yoichi Hirose, Yokohama (JP)

(73) Assignee: Matsushita Electric Industrial, Inc., Osaka (JP)

( * ) Notice: Subject to any disclaimer, the term of this patent is extended or adjusted under 35 U.S.C. 154(b) by 0 days.

(21) Appl. No.: 09/427,096

(22) Filed: Oct. 26, 1999

(30) Foreign Application Priority Data

Nov. 6, 1998 (JP) ............................................ 10-316506

(51) Int. Cl.[7] ................................................. G06K 9/00
(52) U.S. Cl. ........................ 382/162; 358/515; 358/520; 348/446; 348/450
(58) Field of Search ................................. 382/162, 166, 382/167; 358/520, 515; 348/446, 450

(56) References Cited

U.S. PATENT DOCUMENTS 5,841,480 A * 11/1998 Rhodes ........................ 348/459
6,393,164 B2 * 5/2002 Shimizu et al. ............. 382/325

FOREIGN PATENT DOCUMENTS

| EP | 0781056 | 6/1997 |
|---|---|---|
| JP | 08-125903 | 5/1996 |

* cited by examiner

Primary Examiner—Jayanti K. Patel
Assistant Examiner—Ali Bayat
(74) Attorney, Agent, or Firm—Louis Woo

(57) ABSTRACT

An imaging system includes an imager outputting an analog green signal, an analog blue signal, and an analog red signal in a predetermined progressive-scanning format. The analog green, blue, and red signals are converted into parallel-form digital green, blue, and red signals, respectively. A set of the parallel-form digital green, blue, and red signals is converted into a set of a parallel-form digital luminance signal, a first parallel-form digital color-difference signal, and a second parallel-form digital color-difference signal. A signal divider separates the parallel-form digital luminance signal into a first sub parallel-form digital luminance signal and a second sub parallel-form digital luminance signal. The first and second sub parallel-form digital luminance signals are converted into a serial-form digital luminance signal. The first and second parallel-form digital color-difference signals are converted into a serial-form digital color-difference signal. A first electric-to-optical converter converts the serial-form digital luminance signal into a first optical signal having a first predetermined wavelength. A second electric-to-optical converter converts the serial-form digital color-difference signal into a second optical signal having a second predetermined wavelength different from the first predetermined wavelength. An optical multiplexer multiplexes the first optical signal and the second optical signal into a multiplexed optical signal, and outputs the multiplexed optical signal to an optical transmission line.

11 Claims, 12 Drawing Sheets

IMAGING SYSTEM

BACKGROUND OF THE INVENTION

1. Field of the Invention

This invention relates to an imaging system including a solid-state imager.

2. Description of the Related Art

A known imaging system includes a solid-state imager (a solid-state camera), a transmitter, and a receiver. The solid-state imager is followed by the transmitter. The transmitter and the receiver are connected via an optical transmission line. The receiver is formed by a camera control unit (CCU). Image signals outputted from the solid-state imager are converted by the transmitter into serial-form digital signals. The serial-form digital signals are changed by the transmitter into corresponding optical signals. The optical signals are transmitted from the transmitter to the receiver via the optical transmission line.

In the known imaging system, the optical signals are changed by the receiver into corresponding serial-form digital signals. The serial-form digital signals are converted by the receiver into original image signals. In this way, the original image signals are recovered in the receiver.

SUMMARY OF THE INVENTION

It is an object of this invention to provide an improved imaging system.

A first aspect of this invention provides an imaging system comprising an imager outputting an analog green signal, an analog blue signal, and an analog red signal in a predetermined progressive-scanning format; an analog-to-digital converter converting the analog green signal, the analog blue signal, and the analog red signal into a parallel-form digital green signal, a parallel-form digital blue signal, and a parallel-form digital red signal, respectively; a signal converter converting a set of the parallel-form digital green signal, the parallel-form digital blue signal, and the parallel-form digital red signal into a set of a parallel-form digital luminance signal, a first parallel-form digital color-difference signal, and a second parallel-form digital color-difference signal; a signal divider separating the parallel-form digital luminance signal into a first sub parallel-form digital luminance signal and a second sub parallel-form digital luminance signal; a first parallel-to-serial converter converting the first and second sub parallel-form digital luminance signals into a serial-form digital luminance signal; a second parallel-to-serial converter converting the first and second parallel-form digital color-difference signals into a serial-form digital color-difference signal; a first electric-to-optical converter converting the serial-form digital luminance signal into a first optical signal having a first predetermined wavelength; a second electric-to-optical converter converting the serial-form digital color-difference signal into a second optical signal having a second predetermined wavelength different from the first predetermined wavelength; and an optical multiplexer multiplexing the first optical signal and the second optical signal into a multiplexed optical signal, and outputting the multiplexed optical signal to an optical transmission line.

A second aspect of this invention is based on the first aspect thereof, and provides an imaging system further comprising an optical demultiplexer receiving the multiplexed optical signal from the optical transmission line, and demultiplexing the multiplexed optical signal into the first optical signal and the second optical signal; a first optical-to-electric converter converting the first optical signal generated by the optical demultiplexer into the serial-form digital luminance signal; a second optical-to-electric converter converting the second optical signal generated by the optical demultiplexer into the serial-form digital color-difference signal; a first serial-to-parallel converter converting the serial-form digital luminance signal generated by the first optical-to-electric converter into the first and second sub parallel-form digital luminance signals; a second serial-to-parallel converter converting the serial-form digital color-difference signal generated by the second optical-to-electric converter into the first and second parallel-form digital color-difference signals; and a signal combining device multiplexing the first and second sub parallel-form digital luminance signals generated by the first serial-to-parallel converter into the parallel-form digital luminance signal.

A third aspect of this invention provides an imaging system comprising an imager outputting an analog green signal, an analog blue signal, and an analog red signal in a predetermined progressive-scanning format; a signal source generating a first sampling clock signal having a predetermined frequency; a delay device delaying the first sampling clock signal into a second sampling clock signal by a time equal to half a period of the first sampling clock signal; a first analog-to-digital converter converting the analog green signal, the analog blue signal, and the analog red signal into a first parallel-form digital green signal, a first parallel-form digital blue signal, and a first parallel-form digital red signal in response to the first sampling clock signal, respectively; a second analog-to-digital converter converting the analog green signal, the analog blue signal, and the analog red signal into a second parallel-form digital green signal, a second parallel-form digital blue signal, and a second parallel-form digital red signal in response to the second sampling clock signal, respectively; a first signal converter converting a set of the first parallel-form digital green signal, the first parallel-form digital-blue signal, and the first parallel-form digital red signal into a set of a first parallel-form digital luminance signal, a first parallel-form digital color-difference signal, and a second parallel-form digital color-difference signal; a second signal converter converting a set of the second parallel-form digital green signal, the second parallel-form digital blue signal, and the second parallel-form digital red signal into a set of a second parallel-form digital luminance signal, a third parallel-form digital color-difference signal, and a fourth parallel-form digital color-difference signal; a first electric multiplexer multiplexing the first and second parallel-form digital color-difference signals into a first multiplexed parallel-form digital color-difference signal; a second electric multiplexer multiplexing the third and fourth parallel-form digital color-difference signals into a second multiplexed parallel-form digital color-difference signal; a first parallel-to-serial converter converting the first parallel-form digital luminance signal and the first multiplexed parallel form digital color-difference signal into a first serial-form digital composite signal; a second parallel-to-serial converter converting the second parallel-form digital luminance signal and the second multiplexed parallel-form digital color-difference signal into a second serial-form digital composite signal; a first electric-to-optical converter converting the first serial-form digital composite signal into a first optical signal having a first predetermined wavelength; a second electric-to-optical converter converting the second serial-form digital composite signal into a second optical signal having a second predetermined wavelength different from the first predetermined wavelength; and an optical multiplexer multiplexing the first optical signal and the second optical signal into a multiplexed optical signal, and outputting the multiplexed optical signal to an optical transmission line.

A fourth aspect of this invention is based on the third aspect thereof, and provides an imaging system further comprising an optical demultiplexer receiving the multiplexed optical signal from the optical transmission line, and demultiplexing the multiplexed optical signal into the first optical signal and the second optical signal; a first optical-to-electric converter converting the first optical signal generated by the optical demultiplexer into the first serial-form digital composite signal; a second optical-to-electric converter converting the second optical signal generated by the optical demultiplexer into the second serial-form digital composite signal; a first serial-to-parallel converter converting the first serial-form digital composite signal generated by the first optical-to-electric converter into the first parallel-form digital luminance signal and the first multiplexed parallel-form digital color-difference signal; a second serial-to-parallel converter converting the second serial-form digital composite signal generated by the second optical-to-electric converter into the second parallel-form digital luminance signal and the second multiplexed parallel-form digital color-difference signal; a first electric demultiplexer demultiplexing the first multiplexed parallel-form digital color-difference signal generated by the first serial-to-parallel converter into the first and second parallel-form digital color-difference signals; a second electric demultiplexer demultiplexing the second multiplexed parallel-form digital color-difference signal generated by the second serial-to-parallel converter into the third and fourth parallel-form digital color-difference signals; and a signal combining device multiplexing the first parallel-form digital luminance signal generated by the first serial-to-parallel converter and the second parallel-form digital luminance signal generated by the second serial-to-parallel converter into a multiplexed parallel-form digital luminance signal, multiplexing the first parallel-form digital color-difference signal generated by the first electric demultiplexer and the third parallel-form digital color-difference signal generated by the second electric demultiplexer into a first multiplexed parallel-form digital color-difference signal, and multiplexing the second parallel-form digital color-difference signal generated by the first electric demultiplexer and the fourth parallel-form digital color-difference signal generated by the second electric demultiplexer into a second multiplexed parallel-form digital color-difference signal.

A fifth aspect of this invention provides an imaging system comprising an imager outputting a first analog green signal, a second analog green signal, an analog blue signal, and an analog red signal in a predetermined interlaced-scanning format; an analog-to-digital converter converting the first analog green signal, the second analog green signal, the analog blue signal, and the analog red signal into a first parallel-form digital green signal, a second parallel-form digital green signal, a parallel-form digital blue signal, and a parallel-form digital red signal, respectively; a first signal converter converting a set of the first parallel-form digital green signal, the parallel-form digital blue signal, and the parallel-form digital red signal into a set of a first parallel-form digital luminance signal, a first parallel-form digital color-difference signal, and a second parallel-form digital color-difference signal; a second signal converter converting a set of the second parallel-form digital green signal, the parallel-form digital blue signal, and the parallel-form digital red signal into a set of a second parallel-form digital luminance signal, a third parallel-form digital color-difference signal, and a fourth parallel-form digital color-difference signal; a first electric multiplexer multiplexing the first and second parallel-form digital color-difference signals into a first multiplexed parallel-form digital color-difference signal; a second electric multiplexer multiplexing the third and fourth parallel-form digital color-difference signals into a second multiplexed parallel-form digital color-difference signal; a first parallel-to-serial converter converting the first parallel-form digital luminance signal and the first multiplexed parallel-form digital color-difference signal into a first serial-form digital composite signal; a second parallel-to-serial converter converting the second parallel-form digital luminance signal and the second multiplexed parallel-form digital color-difference signal into a second serial-form digital composite signal; a first electric-to-optical converter converting the first serial-form digital composite signal into a first optical signal having a first predetermined wavelength; a second electric-to-optical converter converting the second serial-form digital composite signal into a second optical signal having a second predetermined wavelength different from the first predetermined wavelength; and an optical multiplexer multiplexing the first optical signal and the second optical signal into a multiplexed optical signal, and outputting the multiplexed optical signal to an optical transmission line.

A sixth aspect of this invention is based on the fifth aspect thereof, and provides an imaging system further comprising an optical demultiplexer receiving the multiplexed optical signal from the optical transmission line, and demultiplexing the multiplexed optical signal into the first optical signal and the second optical signal; a first optical-to-electric converter converting the first optical signal generated by the optical demultiplexer into the first serial-form digital composite signal; a second optical-to-electric converter converting the second optical signal generated by the optical demultiplexer into the second serial-form digital composite signal; a first serial-to-parallel converter converting the first serial-form digital composite signal generated by the first optical-to-electric converter into the first parallel-form digital luminance signal and the first multiplexed parallel-form digital color-difference signal; a second serial-to-parallel converter converting the second serial-form digital composite signal generated by the second optical-to-electric converter into the second parallel-form digital luminance signal and the second multiplexed parallel-form digital color-difference signal; a first electric demultiplexer demultiplexing the first multiplexed parallel-form digital color-difference signal generated by the first serial-to-parallel converter into the first and second parallel-form digital color-difference signals; a second electric demultiplexer demultiplexing the second multiplexed parallel-form digital color-difference signal generated by the second serial-to-parallel converter into the third and fourth parallel-form digital color-difference signals; and a signal combining device multiplexing the first parallel-form digital luminance signal generated by the first serial-to-parallel converter and the second parallel-form digital luminance signal generated by the second serial-to-parallel converter into a multiplexed parallel-form digital luminance signal, multiplexing the first parallel-form digital color-difference signal generated by the first electric demultiplexer and the third parallel-form digital color-difference signal generated by the second electric demultiplexer into a first multiplexed parallel-form digital color-difference signal, and multiplexing the second parallel-form digital color-difference signal generated by the first electric demultiplexer and the fourth parallel-form digital color-difference signal generated by the second electric demultiplexer into a second multiplexed parallel-form digital color-difference signal.

A seventh aspect of this invention provides an imaging system comprising an imager outputting a first analog green signal, a second analog green signal, an analog blue signal, and an analog red signal in a predetermined interlaced-scanning format; an analog-to-digital converter converting the first analog green signal, the second analog green signal, the analog blue signal, and the analog red signal into a first parallel-form digital green signal, a second parallel-form digital green signal, a parallel-form digital blue signal, and a parallel-form digital red signal, respectively; a first parallel-to-serial converter converting the first and second parallel-form digital green signals into a serial-form digital green signal; a second parallel-to-serial converter converting the parallel-form digital blue signal and the parallel-form digital red signal into a serial form digital blue/red signal; a first electric-to-optical converter converting the serial-form digital green signal into a first optical signal having a first predetermined wavelength; a second electric-to-optical converter converting the serial-form digital blue/red signal into a second optical signal having a second predetermined wavelength different from the first predetermined wavelength; and an optical multiplexer multiplexing the first optical signal and the second optical signal into a multiplexed optical signal, and outputting the multiplexed optical signal to an optical transmission line.

An eighth aspect of this invention is based on the seventh aspect thereof, and provides an imaging system further comprising an optical demultiplexer receiving the multiplexed optical signal from the optical transmission line, and demultiplexing the multiplexed optical signal into the first optical signal and the second optical signal; a first optical-to-electric converter converting the first optical signal generated by the optical demultiplexer into the serial-form digital green signal; a second optical-to-electric converter converting the second optical signal generated by the optical demultiplexer into the serial-form digital blue/red signal; a first serial-to-parallel converter converting the serial-form digital green signal generated by the first optical-to-electric converter into the first and second parallel-form digital green signals; a second serial-to-parallel converter converting the serial-form digital blue/red signal generated by the second optical-to-electric converter into the parallel-form digital blue signal and the parallel-form digital red signal; a signal combining device multiplexing the first and second parallel-form digital green signals generated by the first serial-to-parallel converter into a multiplexed parallel-form digital green signal; and a signal converter converting a set of the multiplexed parallel-form digital green signal, the parallel-form digital blue signal generated by the second serial-to-parallel converter, and the parallel-form digital red signal generated by the second serial-to-parallel converter into a set of a parallel-form digital luminance signal, a first parallel-form digital color-difference signal, and a second parallel-form digital color-difference signal.

A ninth aspect of this invention is based on the seventh aspect thereof, and provides an imaging system further comprising an optical demultiplexer receiving the multiplexed optical signal from the optical transmission line, and demultiplexing the multiplexed optical signal into the first optical signal and the second optical signal; a first optical-to-electric converter converting the first optical signal generated by the optical demultiplexer into the serial-form digital green signal; a second optical-to-electric converter converting the second optical signal generated by the optical demultiplexer into the serial-form digital blue/red signal; a first serial-to-parallel converter converting the serial-form digital green signal generated by the first optical-to-electric converter into the first and second parallel-form digital green signals; a second serial-to-parallel converter converting the serial-form digital blue/red signal generated by the second optical-to-electric converter into the parallel-form digital blue signal and the parallel-form digital red signal; a signal converter converting a set of the first and second parallel-form digital green signals generated by the first serial-to-parallel converter, the parallel-form digital blue signal generated by the second serial-to-parallel converter, and the parallel-form digital red signal generated by the second serial-to-parallel converter into a set of a first parallel-form digital luminance signal, a second parallel-form digital luminance signal, a first parallel-form digital color-difference signal, and a second parallel-form digital color-difference signal; and a signal combining device multiplexing the first and second parallel-form digital luminance signals generated by the signal converter into a multiplexed parallel-form digital luminance signal.

A tenth aspect of this invention provides an imaging system comprising an imager outputting an analog green signal, an analog blue signal, and an analog red signal in a predetermined progressive-scanning format; an analog-to-digital converter converting the analog green signal, the analog blue signal, and the analog red signal into a parallel-form digital green signal, a parallel-form digital blue signal, and a parallel-form digital red signal, respectively; a signal divider separating the parallel-form digital green signal into first and second sub parallel-form digital green signals, separating the parallel-form digital blue signal into first and second sub parallel-form digital blue signals, and separating the parallel-form digital red signal into first and second sub parallel-form digital red signals; a first parallel-to-serial converter converting the first and second sub parallel-form digital green signals into a serial-form digital green signal; a second parallel-to-serial converter converting the first and second sub parallel-form digital blue signals into a serial-form digital blue signal; a third parallel-to-serial converter converting the first and second sub parallel-form digital red signals into a serial-form digital red signal; a first electric-to-optical converter converting the serial-form digital green signal into a first optical signal having a first predetermined wavelength; a second electric-to-optical converter converting the serial-form digital blue signal into a second optical signal having a second predetermined wavelength different from the first predetermined wavelength; a third electric-to-optical converter converting the serial-form digital red signal into a third optical signal having a third predetermined wavelength different from the first predetermined wavelength and the second predetermined wavelength; and an optical multiplexer multiplexing the first optical signal, the second optical signal, and the third optical signal into a multiplexed optical signal, and outputting the multiplexed optical signal to an optical transmission line.

An eleventh aspect of this invention is based on the tenth aspect thereof, and provides an imaging system further comprising an optical demultiplexer receiving the multiplexed optical signal from the optical transmission line, and demultiplexing the multiplexed optical signal into the first optical signal, the second optical signal, and the third optical signal; a first optical-to-electric converter converting the first optical signal generated by the optical demultiplexer into the serial-form digital green signal; a second optical-to-electric converter converting the second optical signal generated by the optical demultiplexer into the serial-form digital blue signal; a third optical-to-electric converter converting the third optical signal generated by the optical demultiplexer into the serial-form digital red signal; a first serial-to-parallel converter converting the serial-form digital green signal generated by the first optical-to-electric converter into the first and second sub parallel-form digital green signals; a second serial-to-parallel converter converting the serial-form digital blue signal generated by the second optical-to-electric converter into the first and second sub parallel-form digital blue signals; a third serial-to-parallel converter converting the serial-form digital red signal generated by the third optical-to-electric converter into the first and second sub parallel-form digital red signals; and a signal combining device multiplexing the first and second sub parallel-form digital green signals generated by the first serial-to-parallel converter into the parallel-form digital green signal, multiplexing the first and second sub parallel-form digital blue signals generated by the second serial-to-parallel converter into the parallel-form digital blue signal, and multiplexing the first and second sub parallel-form digital red signals generated by the third serial-to-parallel converter into the parallel-form digital red signal.

DESCRIPTION OF THE PREFERRED EMBODIMENTS

A prior-art imaging system will be explained below for a better understanding of this invention.

Figure 1:
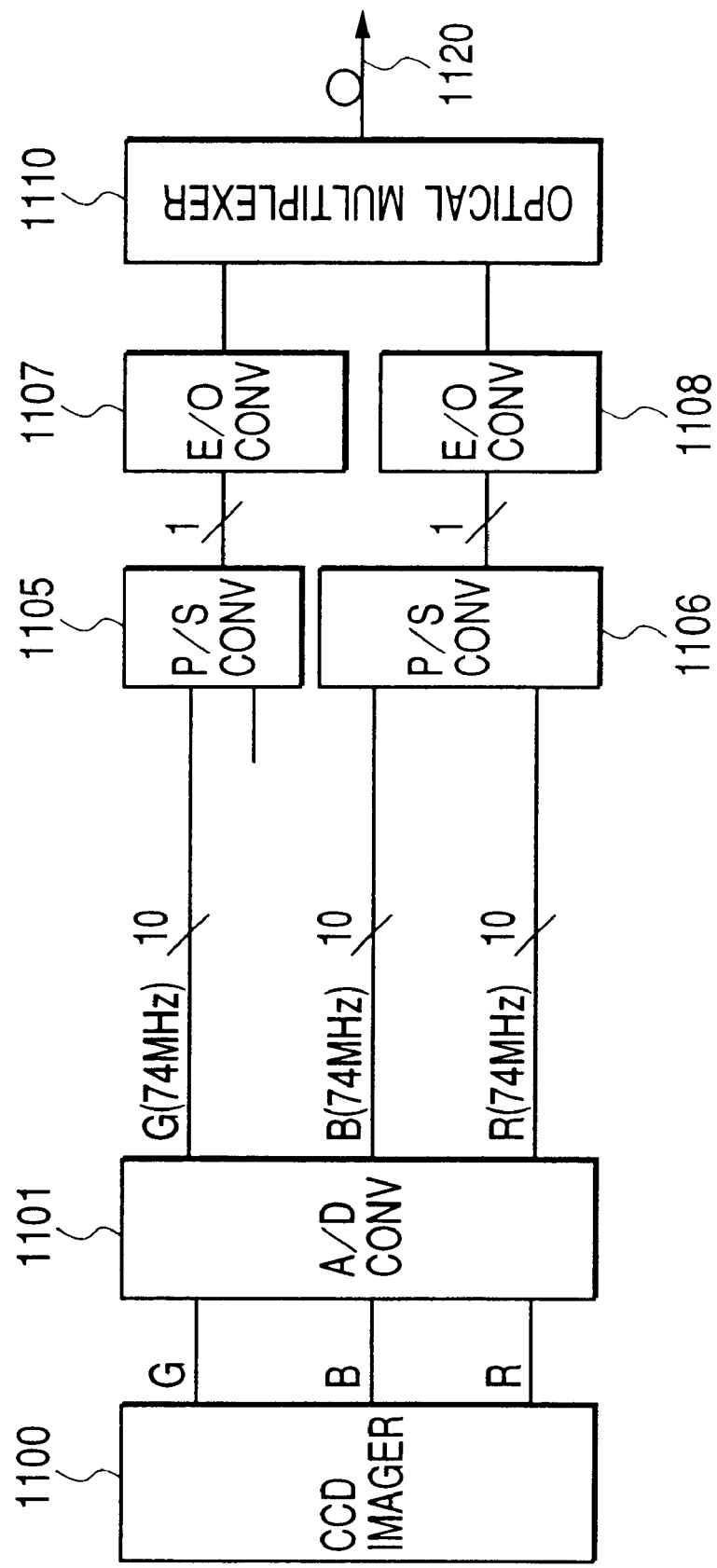
FIG. 1 is a block diagram of a transmitter (a camera head) in a prior-art imaging system.

FIG. 1 shows a transmitter (a camera head) in the prior-art imaging system. With reference to FIG. 1, a solid-state imager 1100 is a CCD camera having three chips or plates for green (G), blue (B), and red (R) respectively. The solid-state imager 1100 outputs analog green, blue, and red signals (analog G, B, and R signals) in a prescribed interlaced-scanning format designed such that every frame is composed of 1,125 horizontal scanning lines. An analog-to-digital (A/D) converter 1101 receives the analog G, B, and R signals from the solid-state imager 1100. The A/D converter 1101 changes the analog G, B, and R signals into corresponding parallel-form digital G, B, and R signals. Specifically, the A/D converter 1101 periodically samples the analog G, B, and R signals at a predetermined sampling frequency, and converts the resultant analog samples into parallel-form digital samples each having 10 bits. The predetermined sampling frequency is equal to about 74 MHz. The predetermined sampling frequency is exactly equal to 74.25 MHz or 74.25/1.001 MHz. The A/D converter 1101 outputs the parallel-form digital G, B, and R signals.

In the transmitter of FIG. 1, a parallel-to-serial (P/S) converter 1105 receives the parallel-form digital G signal from the A/D converter 1101. The P/S converter 1105 changes the parallel-form digital G signal into a serial-form digital G signal (a bit stream) related to a predetermined sampling frequency equal to about 1.5 GHz. The P/S converter 1105 outputs the serial-form digital G signal.

A P/S converter 1106 receives the parallel-form digital R and B signals from the A/D converter 1101. The P/S converter 1106 changes and multiplexes the parallel-form digital B and R signals into a serial-form digital B&R signal (a bit stream) related to the predetermined sampling frequency equal to about 1.5 GHz. The P/S converter 1106 outputs the serial-form digital B&R signal.

In the transmitter of FIG. 1, an electric-to-optical (E/O) converter 1107 receives the serial-form digital G signal from the P/S converter 1105. The E/O converter 1107 changes the serial-form digital G signal into a corresponding optical signal having a predetermined wavelength "α". The E/O converter 1107 outputs the α-related optical signal.

An E/O converter 1108 receives the serial-form digital B&R signal from the P/S converter 1106. The E/O converter 1108 changes the serial-form digital B&R signal into a corresponding optical signal having a predetermined wavelength "β" different from the predetermined wavelength "α". The E/O converter 1108 outputs the β-related optical signal.

In the transmitter of FIG. 1, an optical multiplexer 1110 receives the α-related optical signal and the β-related optical signal from the E/O converters 1107 and 1108. The optical multiplexer 11 combines the α-related optical signal and the β-related optical signal into a multiplexing-resultant optical signal through wavelength division multiplexing. The optical multiplexer 1110 outputs the multiplexing-resultant optical signal to an optical fiber cable 1120. The multiplexing-resultant optical signal propagates along the optical fiber cable 1120.

Figure 2:
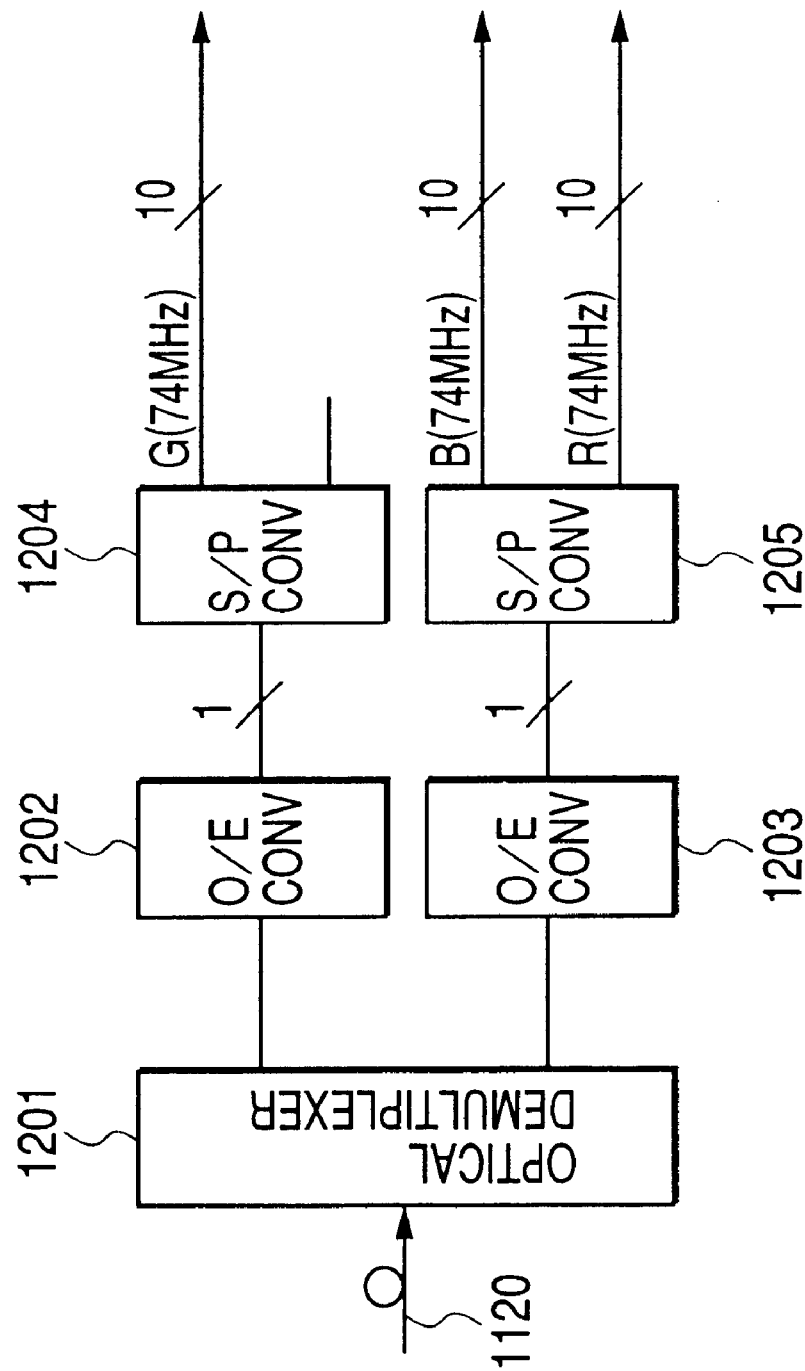
FIG. 2 is a block diagram of a receiver (a camera control unit or a CCU) in the prior-art imaging system.

FIG. 2 shows a receiver (a camera control unit or a CCU) in the prior-art imaging system. With reference to FIG. 2, an optical demultiplexer 1201 receives an optical signal from the optical fiber cable 1120. The optical demultiplexer 1201 separates the received optical signal into an optical signal having the predetermined wavelength "α" and an optical signal having the predetermined wavelength "β". The optical demultiplexer 1201 outputs the α-related optical signal and the β-related optical signal.

In the receiver of FIG. 2, an optical-to-electric (O/E) converter 1202 receives the α-related optical signal from the optical demultiplexer 1201. The O/E converter 1202 changes the α-related optical signal into a corresponding serial-form digital G signal related to the predetermined sampling frequency equal to about 1.5 GHz. The O/E converter 1202 outputs the serial-form digital G signal.

An O/E converter 1203 receives the β-related optical signal from the optical demultiplexer 1201. The O/E converter 1203 changes the β-related optical signal into a corresponding serial-form digital B&R signal related to the predetermined sampling frequency equal to about 1.5 GHz. The O/E converter 1203 outputs the serial-form digital B&R signal.

In the receiver of FIG. 2, a serial-to-parallel (S/P) converter 1204 receives the serial-form digital G signal from the O/E converter 1202. The S/P converter 1204 changes the serial-form digital G signal into a parallel-form 10-bit digital G signal related to the predetermined sampling frequency equal to about 74 MHz. In this way, the parallel-form digital G signal is recovered. The S/P converter 1204 outputs the parallel-form digital G signal.

An S/P converter 1205 receives the serial-form digital B&R signal from the O/E converter 1203. The S/P converter 1205 changes and demultiplexes the serial-form digital B&R signal into a parallel-form 10-bit digital B signal and a parallel-form 10-bit digital R signal which are related to the predetermined sampling frequency equal to about 74 MHz. In this way, the parallel-form digital B signal and the parallel-form digital R signal are recovered. The S/P converter 1205 outputs the parallel-form digital B signal and the parallel-form digital R signal.

The transmitter of FIG. 1 is unsuited for parallel-form digital G, B, and R signals which are in a progressive-scanning format, and which relate to a sampling frequency of about 148 MHz. The receiver of FIG. 2 can not output parallel-form digital G, B, and R signals which are in a progressive-scanning format, and which relate to a sampling frequency of about 148 MHz.

In the transmitter of FIG. 1, the P/S converters 1105 and 1106 can use equal circuits each designed to process a parallel-form 20-bit digital signal. In this case, a half of the circuit of the P/S converter 1105 for the G signal is unused. Alternatively, the P/S converters 1105 and 1106 can use different exclusive circuits respectively. In this case, the transmitter tends to be high in cost.

In the receiver of FIG. 2, the S/P converters 1204 and 1205 can use equal circuits each designed to output a pair of parallel-form 10-bit digital signals. In this case, a half of the circuit of the S/P converter 1204 for the G signal is unused. Alternatively, the S/P converters 1204 and 1205 can use different exclusive circuits respectively. In this case, the receiver tends to be high in cost.

First Embodiment

Figure 3:
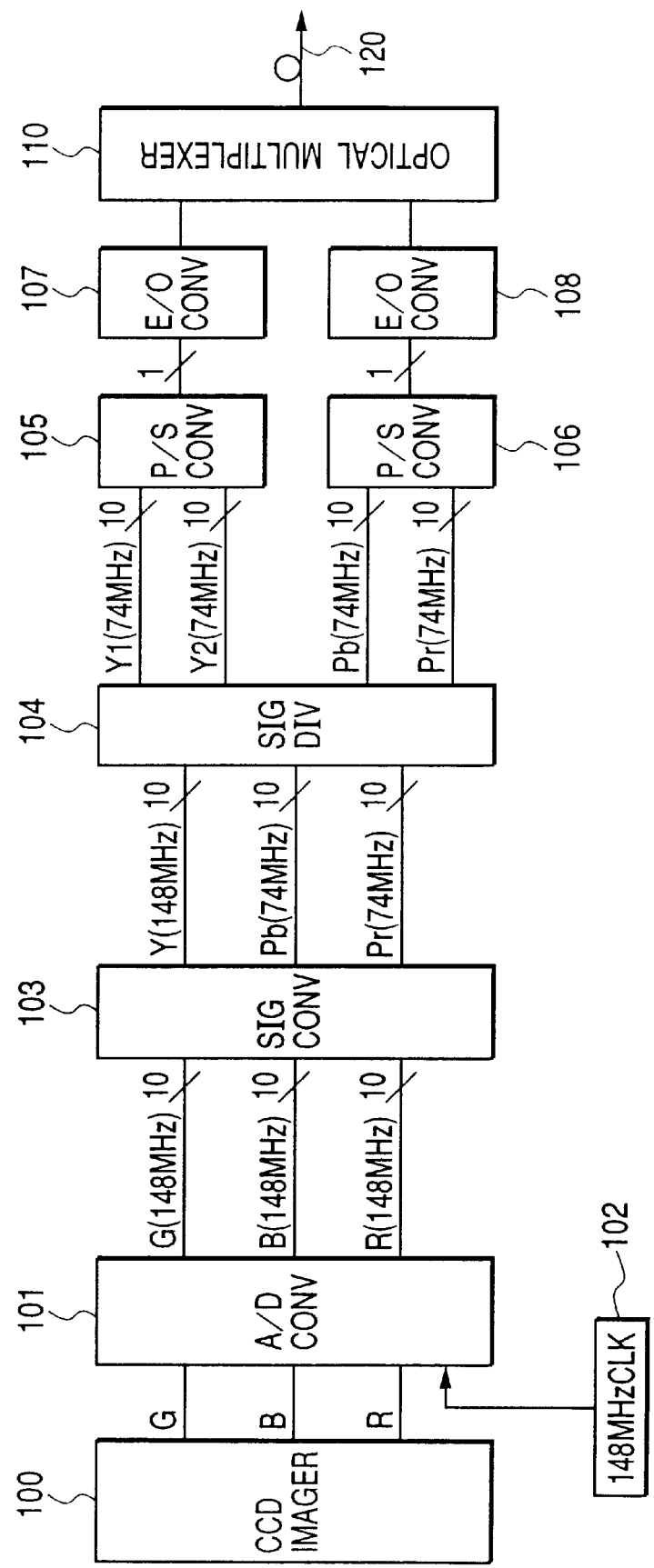
FIG. 3 is a block diagram of a transmitter (a camera head) in an imaging system according to a first embodiment of this invention.

FIG. 3 shows a transmitter (a camera head) in an imaging system according to a first embodiment of this invention. With reference to FIG. 3, a solid-state imager 100 is a CCD camera having three chips or plates for green (G), blue (B), and red (R) respectively. The solid-state imager 100 outputs analog green, blue, and red signals (analog G, B, and R signals) in a prescribed progressive-scanning format designed such that every frame is composed of 1,125 horizontal scanning lines. An analog-to-digital (A/D) converter 101 receives the analog G, B, and R signals from the solid-state imager 100. A signal source 102 outputs a sampling clock signal to the A/D converter 101. The sampling clock signal has a predetermined frequency equal to about 148 MHz. The A/D converter 101 changes the analog G, B, and R signals into corresponding parallel-form digital G, B, and R signals in response to the sampling clock signal. Specifically, the A/D converter 101 periodically samples the analog G, B, and R signals in response to the sampling clock signal, and converts the resultant analog samples into parallel-form digital samples each having 10 bits. The parallel-form digital G, B, and R signals relate to a predetermined sampling frequency equal to about 148 MHz. The A/D converter 101 outputs the parallel-form digital G, B, and R signals.

In the transmitter of FIG. 3, a signal converter 103 receives the parallel-form digital G, B, and R signals from the A/D converter 101. The signal converter 103 changes a set of the parallel-form digital G, B, and R signals into a set of a parallel-form digital luminance signal Y, a parallel-form digital blue-related color-difference signal Pb, and a parallel-form digital red-related color-difference signal Pr. Every sample of the parallel-form digital luminance signal Y has 10 bits. Every sample of the parallel-form digital color-difference signal Pb has 10 bits. Every sample of the parallel-form digital color-difference signal Pr has 10 bits. The parallel-form digital luminance signal Y relates to the predetermined sampling frequency equal to about 148 MHz. The parallel-form digital color-difference signals Pb and Pr relate to a predetermined sampling frequency equal to about 74 MHz. The signal converter 103 outputs the parallel-form digital luminance signal Y and the parallel-form digital color-difference signals Pb and Pr.

A signal divider 104 receives the parallel-form digital luminance signal Y and the parallel-form digital color-difference signals Pb and Pr from the signal converter 103. The signal divider 104 separates the parallel-form digital luminance signal Y into a first sub parallel-form digital luminance signal Y1 and a second sub parallel-form digital luminance signal Y2 on a time sharing basis. Every sample of the first sub parallel-form digital luminance signal Y1 has 10 bits. Every sample of the second sub parallel-form digital luminance signal Y2 has 10 bits. The sub parallel-form digital luminance signals Y1 and Y2 relate to the predetermined sampling frequency equal to about 74 MHz. The signal divider 104 outputs the sub parallel-form digital luminance signals Y1 and Y2. The parallel-form digital color-difference signals Pb and Pr pass through the signal divider 104. Thus, the signal divider 104 outputs the parallel-form digital color-difference signals Pb and Pr. Preferably, the signal divider 104 includes a suitable circuit designed to match timings of the output signals Y1, Y2, Pb, and Pr.

In the transmitter of FIG. 3, a parallel-to-serial (P/S) converter 105 receives the sub parallel-form digital luminance signals Y1 and Y2 from the signal divider 104. The P/S converter 105 changes and multiplexes the sub parallel-form digital luminance signals Y1 and Y2 into a serial-form digital luminance signal (a bit stream) related to a predetermined sampling frequency equal to about 1.5 GHz. The P/S converter 105 outputs the serial-form digital luminance signal.

A P/S converter, 106 receives the parallel-form digital color-difference signals Pb and Pr from the signal divider 104. The P/S converter 106 changes and multiplexes the parallel-form digital color-difference signals Pb and Pr into a serial-form digital color-difference signal (a bit stream) related to the predetermined sampling frequency equal to about 1.5 GHz. The P/S converter 106 outputs the serial-form digital color-difference signal.

In the transmitter of FIG. 3, an electric-to-optical (E/Q) converter 107 receives the serial-form digital luminance signal from the P/S converter 105. The E/O converter 107 changes the serial-form digital luminance signal into a corresponding optical signal having a predetermined wavelength "α". The E/O converter 107 outputs the α-related optical signal.

An E/O converter 108 receives the serial-form digital color-difference signal from the P/S converter 106. The E/O converter 108 changes the serial-form digital color-difference signal into a corresponding optical signal having a predetermined wavelength "β" different from the predetermined wavelength "α". The E/O converter 108 outputs the β-related optical signal.

In the transmitter of FIG. 3, an optical multiplexer 110 receives the α-related optical signal and the β-related optical signal from the E/O converters 107 and 108. The optical multiplexer 110 combines the α-related optical signal and the β-related optical signal into a multiplexing-resultant optical signal through wavelength division multiplexing. The optical multiplexer 110 outputs the multiplexing-resultant optical signal to an optical transmission line or an optical fiber cable 120. The multiplexing-resultant optical signal propagates along the optical fiber cable 120.

Figure 4:
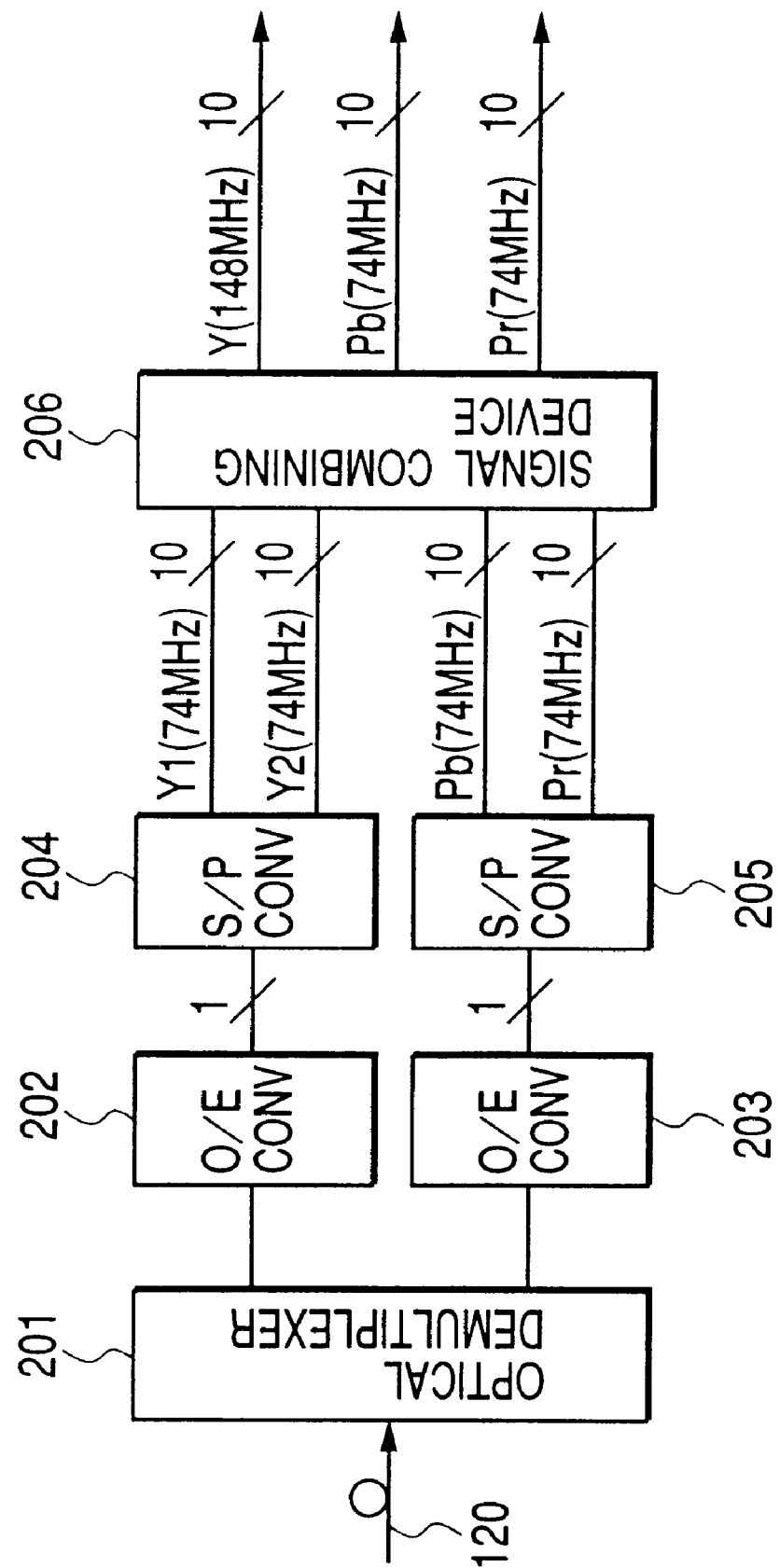
FIG. 4 is a block diagram of a receiver (a camera control unit or a CCU) in the imaging system according to the first embodiment of this invention.

FIG. 4 shows a receiver (a camera control unit or a CCU) in the imaging system according to the first embodiment of this invention. With reference to FIG. 4, an optical demultiplexer 201 receives an optical signal from the optical fiber cable 120. The optical demultiplexer 201 separates the received optical signal into an optical signal having the predetermined wavelength "α" and an optical signal having the predetermined wavelength "β". The optical demultiplexer 201 outputs the α-related optical signal and the β-related optical signal.

In the receiver of FIG. 4, an optical-to-electric (O/E) converter 202 receives the u-related optical signal from the optical demultiplexer 201. The O/E converter 202 changes the α-related optical signal into a corresponding serial-form digital luminance signal related to the predetermined sampling frequency equal to about 1.5 GHz. The O/E converter 202 outputs the serial-form digital luminance signal.

An O/E converter 203 receives the β-related optical signal from the optical demultiplexer 201. The O/E converter 203 changes the β-related optical signal into a corresponding serial-form digital color-difference signal related to the predetermined sampling frequency equal to about 1.5 GHz. The O/E converter 203 outputs the serial-form digital color-difference signal.

In the receiver of FIG. 4, a serial-to-parallel (S/P) converter 204 receives the serial-form digital luminance signal from the O/E converter 202. The S/P converter 204 changes and divides (demultiplexes) the serial-form digital luminance signal into a first sub parallel-form digital luminance signal Y1 and a second sub parallel-form digital luminance signal Y2. Every sample of the first sub parallel-form digital luminance signal Y1 has 10 bits. Every sample of the second sub parallel-form digital luminance signal Y2 has 10 bits. The sub parallel-form digital luminance signals Y1 and Y2 relate to the predetermined sampling frequency equal to about 74 MHz. The S/P converter 204 outputs the sub parallel-form digital luminance signals Y1 and Y2.

An S/P converter 205 receives the serial-form digital color-difference signal from the O/E converter 203. The S/P converter 205 changes and divides (demultiplexes) the serial-form digital color-difference signal into a parallel-form digital blue-related color-difference signal Pb and a parallel-form digital red-related color-difference signal Pr. Every sample of the parallel-form digital color-difference signal Pb has 10 bits. Every sample of the parallel-form digital color-difference signal Pr has 10 bits. The parallel-form digital color-difference signals Pb and Pr relate to the predetermined sampling frequency equal to about 74 MHz. In this way, the parallel-form digital color-difference signals Pb and Pr are recovered. The S/P converter 205 outputs the parallel-form digital color-difference signals Pb and Pr.

In the receiver of FIG. 4, a signal combining device 206 receives the sub parallel-form digital luminance signals Y1 and Y2 from the S/P converter 204. The signal combining device 206 multiplexes the sub parallel-form digital luminance signals Y1 and Y2 into a parallel-form 10-bit digital luminance signal Y related to the predetermined sampling frequency equal to about 148 MHz. In this way, the parallel-form digital luminance signal Y is recovered. The signal combining device 206 outputs the parallel-form digital luminance signal Y. The signal combining device 206 receives the parallel-form digital color-difference signals Pb and Pr from the S/P converter 205. The parallel-form digital color-difference signals Pb and Pr pass through the signal combining device 206. Thus, the signal combining device 206 outputs the parallel-form digital color-difference signals Pb and Pr. Preferably, the signal combining device 206 includes a suitable circuit designed to match timings of the output signals Y, Pb, and Pr.

In the transmitter of FIG. 3, since the input signals to the P/S converters 105 and 106 relate to a sampling frequency of about 74 MHz, it is unnecessary to provide special P/S converters capable of processing input signals related to a sampling frequency of about 148 MHz. In the receiver of FIG. 4, since the output signals from the S/P converters 204 and 205 relate to a sampling frequency of about 74 MHz, it is unnecessary to provide special S/P converters capable of outputting signals related to a sampling frequency of about 148 MHz.

Second Embodiment

Figure 5:
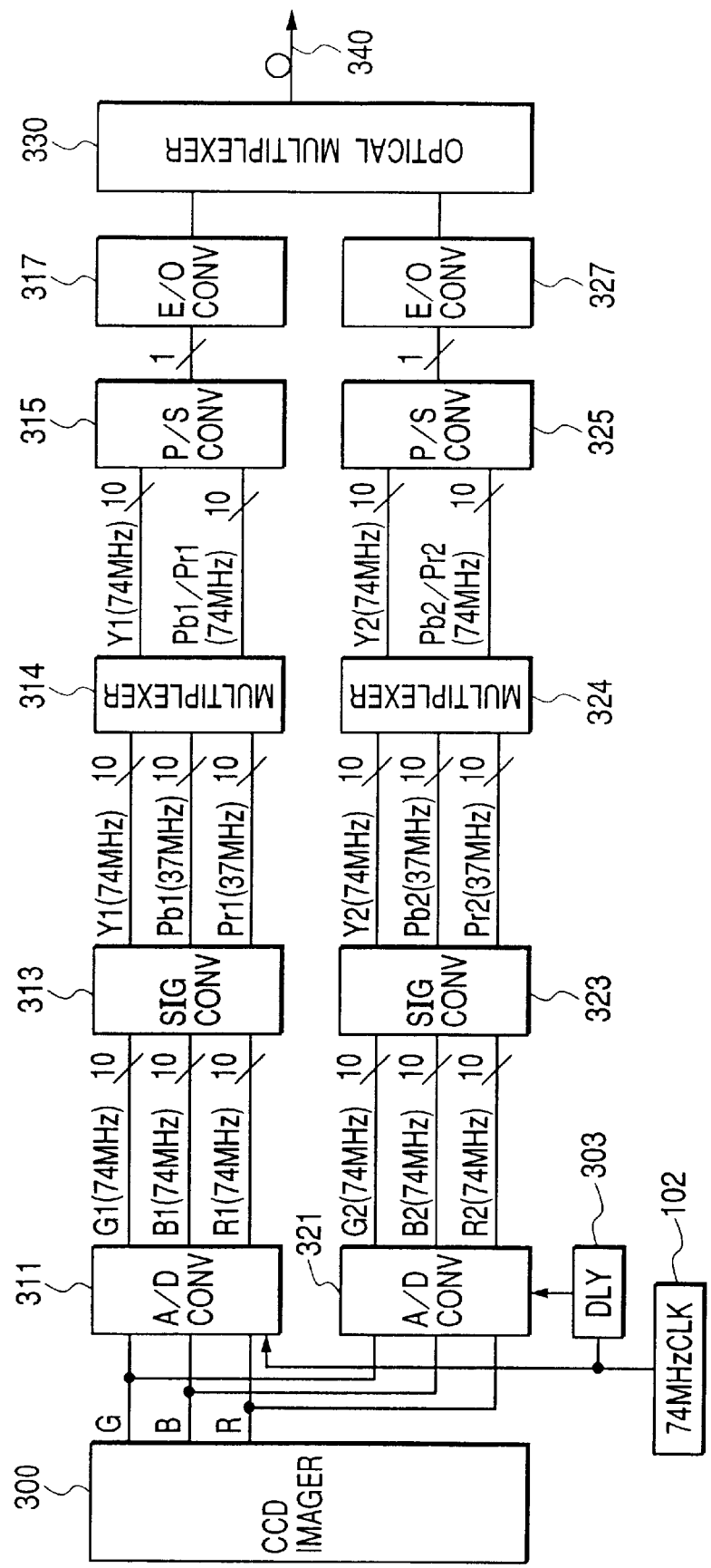
FIG. 5 is a block diagram of a transmitter (a camera head) in an imaging system according to a second embodiment of this invention.

FIG. 5 shows a transmitter (a camera head) in an imaging system according to a second embodiment of this invention. With reference to FIG. 5, a solid-state imager 300 is a CCD camera having three chips or plates for green (G), blue (B), and red (R) respectively. The solid-state imager 300 outputs analog green, blue, and red signals (analog G, B, and R signals) in a prescribed progressive-scanning format designed such that every frame is composed of 1,125 horizontal scanning lines.

An analog-to-digital (A/D) converter 311 receives the analog G, B, and R signals from the solid-state imager 300. A signal source 302 outputs a sampling clock signal to the A/D converter 311. The sampling clock signal has a predetermined frequency equal to about 74 MHz. The A/D converter 311 changes the analog G, B, and R signals into corresponding parallel-form digital green, blue, and red signals G1, B1, and R1 in response to the sampling clock signal. Specifically, the A/D converter 311 periodically samples the analog G, B, and R signals in response to the sampling clock signal, and converts the resultant analog samples into parallel-form digital samples each having 10 bits. The parallel-form digital green, blue, and red signals G1, B1, and R1 relate to a predetermined sampling frequency equal to about 74 MHz. The A/D converter 311 outputs the parallel-form digital-green, blue, and red signals G1, B1, and R1.

An A/D converter 321 receives the analog G, B, and R signals from the solid-state imager 300. The signal source 302 outputs the sampling clock signal to a delay device 303.

The delay device 303 defers the sampling clock signal by a time equal to half the period of the sampling clock signal. The delay device 303 outputs the delayed sampling clock signal to the A/D converter 321. The A/D converter 321 changes the analog G, B, and R signals into corresponding parallel-form digital green, blue, and red signals G2, B2, and R2 in response to the delayed sampling clock signal. Specifically, the A/D converter 321 periodically samples the analog G, B, and R signals in response to the delayed sampling clock signal, and converts the resultant analog samples into parallel-form digital samples each having 10 bits. The parallel-form digital green, blue, and red signals G2, B2, and R2 relate to the predetermined sampling frequency equal to about 74 MHz. The A/D converter 321 outputs the parallel-form digital green, blue, and red signals G2, B2, and R2.

As previously mentioned, the sampling clock signal applied to the A/D converter 321 delays from that applied to the A/D converter 311 by a time equal to half the period of the sampling clock signal. Therefore, a combination of the parallel-form digital green signals G1 and G2 is equivalent to a parallel-form digital green signal which results from A/D conversion of the analog G signal at a sampling frequency equal to twice the frequency of the sampling clock signal, that is, equal to about 148 MHz. Also, a combination of the parallel-form digital blue signals B1 and B2 is equivalent to a parallel-form digital blue signal which results from A/D conversion of the analog B signal at a sampling frequency equal to twice the frequency of the sampling clock signal. In addition, a combination of the parallel-form digital red signals R1 and R2 is equivalent to a parallel-form digital red signal which results from A/D conversion of the analog R signal at a sampling frequency equal to twice the frequency of the sampling clock signal.

In the transmitter of FIG. 5, a signal converter 313 receives the parallel-form digital green, blue, and red signals G1, B1, and R1 from the A/D converter 311. The signal converter 313 changes a set of the parallel-form digital green, blue, and red signals G1, B1, and R1 into a set of a parallel-form digital luminance signal Y1, a parallel-form digital blue-related color-difference signal Pb 1, and a parallel-form digital red-related color-difference signal Pr1. Every sample of the parallel-form digital luminance signal Y1 has 10 bits. Every sample of the parallel-form digital color-difference signal Pb1 has 10 bits. Every sample of the parallel-form digital color-difference signal Pr1 has 10 bits. The parallel-form digital luminance signal Y1 relates to the predetermined sampling frequency equal to about 74 MHz. The parallel-form digital color-difference signals Pb1 and Pr1 relate to a predetermined sampling frequency equal to about 37 MHz. The signal converter 313 outputs the parallel-form digital luminance signal Y1 and the parallel-form digital color-difference signals Pb1 and Pr1.

A signal converter 323 receives the parallel-form digital green, blue, and red signals G2, B2, and R2 from the A/D converter 321. The signal converter 323 changes a set of the parallel-form digital green, blue, and red signals G2, B2, and R2 into a set of a parallel-form digital luminance signal Y2, a parallel-form digital blue-related color-difference signal Pb2, and a parallel-form digital red-related color-difference signal Pr2. Every sample of the parallel-form digital luminance signal Y2 has 10 bits. Every sample of the parallel-form digital color-difference signal Pb2 has 10 bits. Every sample of the parallel-form digital color-difference signal Pr2 has 10 bits. The parallel-form digital luminance signal Y2 relates to the predetermined sampling frequency equal to about 74 MHz. The parallel-form digital color-difference signals Pb2 and Pr2 relate to the predetermined sampling frequency equal to about 37 MHz. The signal converter 323 outputs the parallel-form digital luminance signal Y2 and the parallel-form digital color-difference signals Pb2 and Pr2.

In the transmitter of FIG. 5, a multiplexer 314 receives the parallel-form digital luminance signal Y1 and the parallel-form digital color-difference signals Pb1 and Pr1 from the signal converter 313. The multiplexer 314 combines the parallel-form digital color-difference signals Pb1 and Pr1 into a multiplexed parallel-form digital color-difference signal Pb1/Pr1 through multiplexing on a time sharing basis. Every sample of the parallel-form digital color-difference signal Pb1/Pr1 has 10 bits. The parallel-form digital color-difference signal Pb1/Pr1 relates to the predetermined sampling frequency equal to about 74 MHz. The multiplexer 314 outputs the parallel-form digital color-difference signal Pb1/Pr1. The parallel-form digital luminance signal Y1 passes through the multiplexer 314. Thus, the multiplexer 314 outputs the parallel-form digital luminance signal Y1. Preferably, the multiplexer 314 includes a suitable circuit designed to match timings of the output signals Y1 and Pb1/Pr1.

A multiplexer 324 receives the parallel-form digital luminance signal Y2 and the parallel-form digital color-difference signals Pb2 and Pr2 from the signal converter 323. The multiplexer 324 combines the parallel-form digital color-difference signals Pb2 and Pr2 into a multiplexed parallel-form digital color-difference signal Pb2/Pr2 through multiplexing on a time sharing basis. Every sample of the parallel-form digital color-difference signal Pb2/Pr2 has 10 bits. The parallel-form digital color-difference signal Pb2/Pr2 relates to the predetermined sampling frequency equal to about 74 MHz. The multiplexer 324 outputs the parallel-form digital color-difference signal Pb2/Pr2. The parallel-form digital luminance signal Y2 passes through the multiplexer 324. Thus, the multiplexer 324 outputs the parallel-form digital luminance signal Y2. Preferably, the multiplexer 324 includes a suitable circuit designed to match timings of the output signals Y2 and Pb2/Pr2.

In the transmitter of FIG. 5, a parallel-to-serial (P/S) converter 315 receives the parallel-form digital luminance signal Y1 and the parallel-form digital color-difference signal Pb1/Pr1 from the multiplexer 314. The P/S converter 315 changes and multiplexes the parallel-form digital luminance signal Y1 and the parallel-form digital color-difference signal Pb1/Pr1 into a serial-form digital composite signal (a bit stream) Y1/Pb1/Pr1 related to a predetermined sampling frequency equal to about 1.5 GHz. The P/S converter 315 outputs the serial-form digital composite signal Y1/Pb1/Pr1.

A P/S converter 325 receives the parallel-form digital luminance signal Y2 and the parallel-form digital color-difference signal Pb2/Pr2 from the multiplexer 324. The P/S converter 325 changes and multiplexes the parallel-form digital luminance signal Y2 and the parallel-form digital color-difference signal Pb2/Pr2 into a serial-form digital composite signal (a bit stream) Y2/Pb2/Pr2 related to the predetermined sampling frequency equal to about 1.5 GHz. The P/S converter 325 outputs the serial-form digital composite signal Y2/Pb2/Pr2.

In the transmitter of FIG. 5, an electric-to-optical (E/O) converter 317 receives the serial-form digital composite signal Y1/Pb1/Pr1 from the P/S converter 315. The E/O converter 317 changes the serial-form digital composite signal Y1/Pb1/Pr1 into a corresponding optical signal having a predetermined wavelength "α". The E/O converter 317 outputs the α-related optical signal. An E/O converter 327 receives the serial-form digital composite signal Y2/Pb2/Pr2 from the P/S converter 325. The E/O converter 327 changes the serial-form digital composite signal Y2/Pb2/Pr2 into a corresponding optical signal having a predetermined wavelength "β". The E/O converter 327 outputs the β-related optical signal.

In the transmitter of FIG. 5, an optical multiplexer 330 receives the α-related optical signal and the β-related optical signal from the E/O converters 317 and 327. The optical multiplexer 330 combines the α-related optical signal and the β-related optical signal into a multiplexing-resultant optical signal through wavelength division multiplexing. The optical multiplexer 330 outputs the multiplexing-resultant optical signal to an optical transmission line or an optical fiber cable 340. The multiplexing-resultant optical signal propagates along the optical fiber cable 340.

Figure 6:
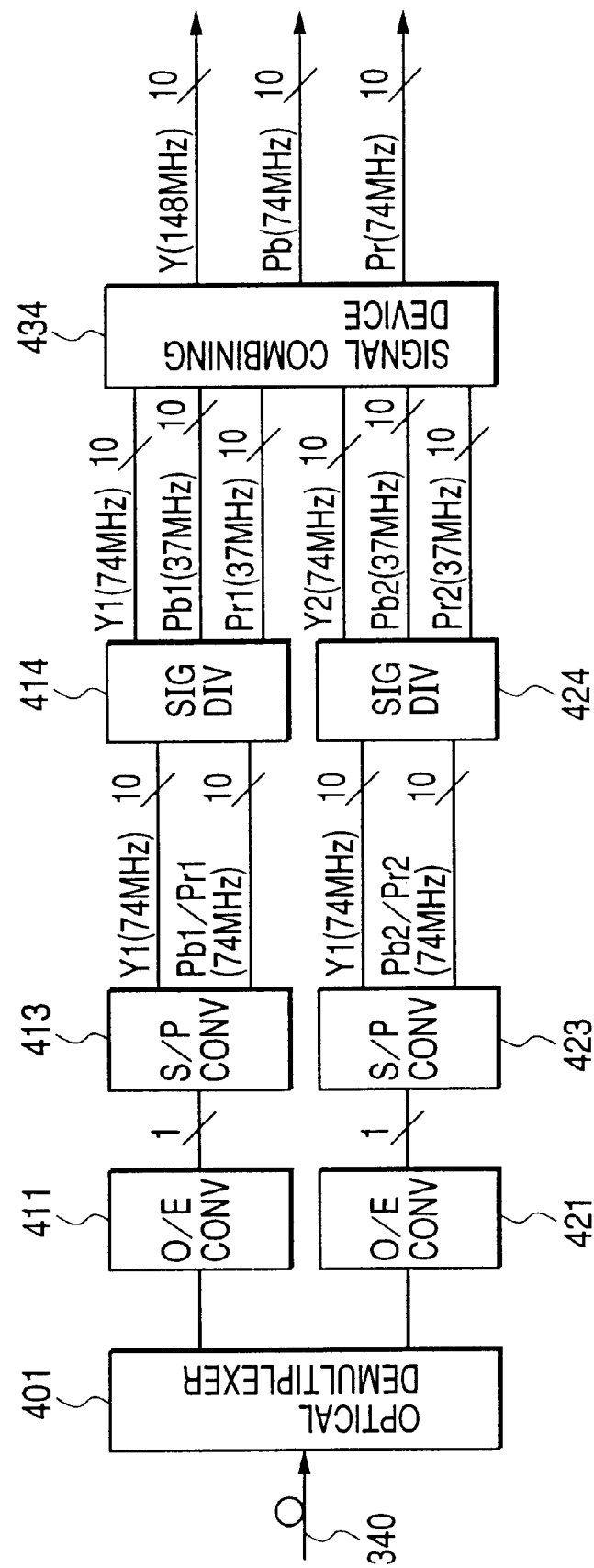
FIG. 6 is a block diagram of a receiver (a camera control unit or a CCU) in the imaging system according to the second embodiment of this invention.

FIG. 6 shows a receiver (a camera control unit or a CCU) in the imaging system according to the second embodiment of this invention. With reference to FIG. 6, an optical demultiplexer 401 receives an optical signal from the optical fiber cable 340. The optical demultiplexer 401 separates the received optical signal into an optical signal having the predetermined wavelength "α" and an optical signal having the predetermined wavelength "β". The optical demultiplexer 401 outputs the α-related optical signal and the β-related optical signal.

In the receiver of FIG. 6, an optical-to-electric (O/E) converter 411 receives the ax-related optical signal from the optical demultiplexer 401. The O/E converter 411 changes the α-related optical signal into a corresponding serial-form digital composite signal Y1/Pb1/Pr1 related to the predetermined sampling frequency equal to about 1.5 GHz. The O/E converter 411 outputs the serial-form digital composite signal Y1/Pb1/Pr1.

An O/E converter 421 receives the β-related optical signal from the optical demultiplexer 401. The O/E converter 421 changes the β-related optical signal into a corresponding serial-form digital composite signal Y2/Pb2/Pr2 related to the predetermined sampling frequency equal to about 1.5 GHz. The O/E converter 421 outputs the serial-form digital composite signal Y2/Pb2/Pr2.

In the receiver of FIG. 6, a serial-to-parallel (S/P) converter 413 receives the serial-form digital composite signal Y1/Pb1/Pr1 from the O/E converter 411. The S/P converter 413 changes and divides (demultiplexes) the serial-form digital composite signal Y1/Pb1/Pr1 into a parallel-form digital luminance signal Y1 and a parallel-form digital color-difference signal Pb1/Pr1. Every sample of the parallel-form digital luminance signal Y1 has 10 bits. Every sample of the parallel-form digital color-difference signal Pb1/Pr1 has 10 bits. The parallel-form digital luminance signal Y1 relates to the predetermined sampling frequency equal to about 74 MHz. The parallel-form digital color-difference signal Pb1/Pr1 relates to the predetermined sampling frequency equal to about 74 MHz. The S/P converter 413 outputs the parallel-form digital luminance signal Y1 and the parallel-form digital color-difference signal Pb1/Pr1.

An S/P converter 423 receives the serial-form digital composite signal Y2/Pb2/Pr2 from the O/E converter 421. The S/P converter 423 changes and divides (demultiplexes) the serial-form digital composite signal Y2/Pb2/Pr2 into a parallel-form digital luminance signal Y2 and a parallel-form digital color-difference signal Pb2/Pr2. Every sample of the parallel-form digital luminance signal Y2 has 10 bits. Every sample of the parallel-form digital color-difference signal Pb2/Pr2 has 10 bits. The parallel-form digital luminance signal Y2 relates to the predetermined sampling frequency equal to about 74 MHz. The parallel-form digital color-difference signal Pb2/Pr2 relates to the predetermined sampling frequency equal to about 74 MHz. The S/P converter 423 outputs the parallel-form digital luminance signal Y2 and the parallel-form digital color-difference signal Pb2/Pr2.

In the receiver of FIG. 6, a demultiplexer 414 receives the parallel-form digital luminance signal Y1 and the parallel-form digital color-difference signal Pb1/Pr1 from the S/P converter 413. The demultiplexer 414 separates the parallel-form digital color-difference signal Pb1/Pr1 into a parallel-form digital blue-related color-difference signal Pb1 and a parallel-form digital red-related color-difference signal Pr1. Every sample of the parallel-form digital color-difference signal Pb1 has 10 bits. Every sample of the parallel-form digital color-difference signal Pr1 has 10 bits. The parallel-form digital color-difference signals Pb1 and Pr1 relate to the predetermined sampling frequency equal to about 37 MHz. The demultiplexer 414 outputs the parallel-form digital color-difference signals Pb1 and Pr1. The parallel-form digital luminance signal Y1 passes through the demultiplexer 414. Thus, the demultiplexer 414 outputs the parallel-form digital luminance signal Y1. Preferably, the demultiplexer 414 includes a suitable circuit designed to match timings of the output signals Y1, Pb1, and Pr1.

A demultiplexer 424 receives the parallel-form digital luminance signal Y2 and the parallel-form digital color-difference signal Pb2/Pr2 from the S/P converter 423. The demultiplexer 424 separates the parallel-form digital color-difference signal Pb2/Pr2 into a parallel-form digital blue-related color-difference signal Pb2 and a parallel-form digital red-related color-difference signal Pr2. Every sample of the parallel-form digital color-difference signal Pb2 has 10 bits. Every sample of the parallel-form digital color-difference signal Pr2 has 10 bits. The parallel-form digital color-difference signals Pb2 and Pr2 relate to the predetermined sampling frequency equal to about 37 MHz. The demultiplexer 424 outputs the parallel-form digital color-difference signals Pb2 and Pr2. The parallel-form digital luminance signal Y2 passes through the demultiplexer 424. Thus, the demultiplexer 424 outputs the parallel-form digital luminance signal Y2. Preferably, the demultiplexer 424 includes a suitable circuit designed to match timings of the output signals Y2, Pb2, and Pr2.

In the receiver of FIG. 6, a signal combining device 434 receives the parallel-form digital luminance signal Y1 and the parallel-form digital color-difference signals Pb1 and Pr1 from the demultiplexer 414. The signal combining device 434 receives the parallel-form digital luminance signal Y2 and the parallel-form digital color-difference signals Pb2 and Pr2 from the demultiplexer 424. The signal combining device 434 multiplexes the parallel-form digital luminance signals Y1 and Y2 into a multiplexed parallel-form digital luminance signal Y related to a predetermined sampling frequency equal to about 148 MHz. Every sample of the parallel-form digital luminance signal Y has 10 bits. The signal combining device 434 outputs the parallel-form digital luminance signal Y. The signal combining device 434 multiplexes the parallel-form digital color-difference signals Pb1 and Pb2 into a multiplexed parallel-form digital color-difference signal Pb related to the predetermined sampling frequency equal to about 74 MHz. Every sample of the parallel-form digital color-difference signal Pb has 10 bits. The signal combining device 434 outputs the parallel-form digital color-difference signal Pb. The signal combining device 434 multiplexes the parallel-form digital color-difference signals Pr1 and Pr2 into a multiplexed parallel-form digital color-difference signal Pr related to the predetermined sampling frequency equal to about 74 MHz. Every sample of the parallel-form digital color-difference signal Pr has 10 bits. The signal combining device 434 outputs the parallel-form digital color-difference signal Pr.

In the transmitter of FIG. 5, since the input signals to the P/S converters 315 and 325 relate to a sampling frequency of about 74 MHz, it is unnecessary to provide special P/S converters capable of processing input signals related to a sampling frequency of about 148 MHz. In the receiver of FIG. 6, since the output signals from the S/P converters 413 and 423 relate to a sampling frequency of about 74 MHz, it is unnecessary to provide special S/P converters capable of outputting signals related to a sampling frequency of about 148 MHz.

Third Embodiment

Figure 7:
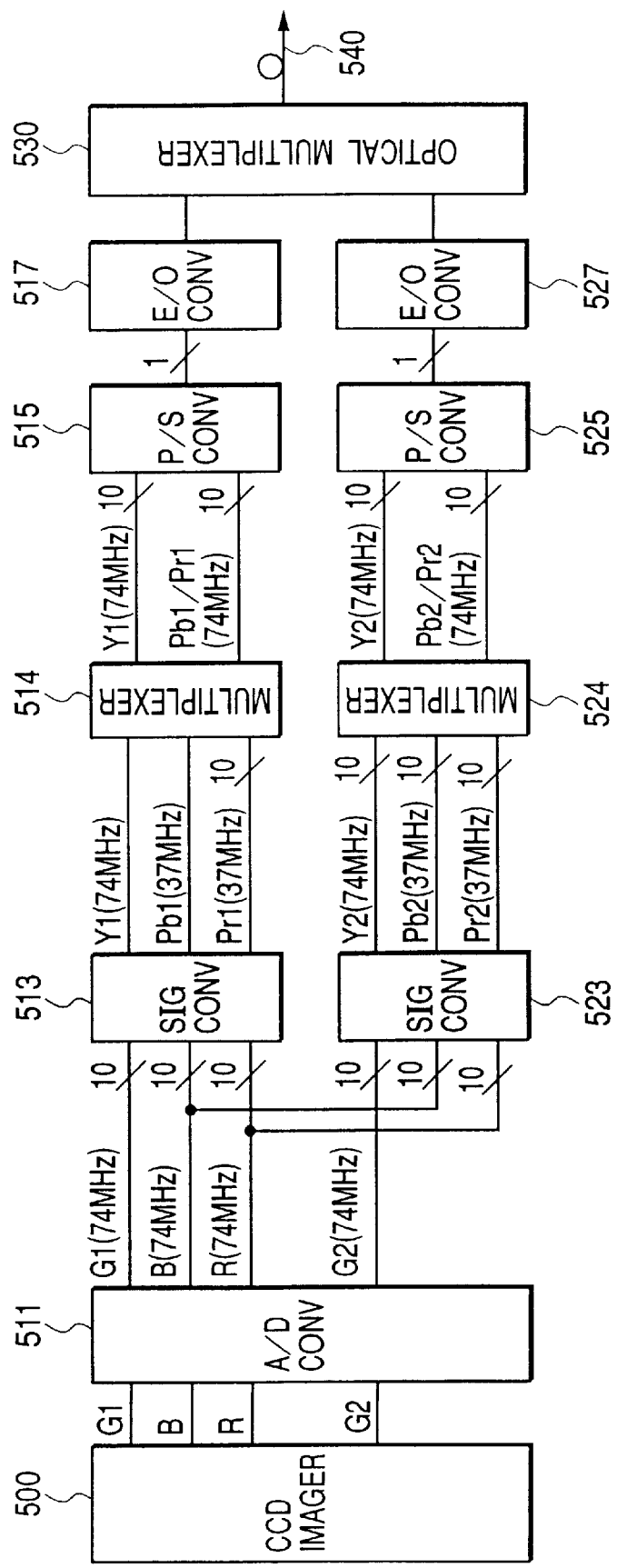
FIG. 7 is a block diagram of a transmitter (a camera head) in an imaging system according to a third embodiment of this invention.

FIG. 7 shows a transmitter (a camera head) in an imaging system according to a third embodiment of this invention. With reference to FIG. 7, a solid-state imager 500 is a CCD camera having four chips or plates for first green (G1), blue (B), red (R), and second green (G2) respectively. The solid-state imager 500 outputs analog first-green, blue, red, and second-green signals (analog G1, B, R, and G2 signals) in a prescribed interlaced-scanning format designed such that every frame is composed of 1,125 horizontal scanning lines, and that the analog G1 signal represents odd-numbered scanning lines while the analog G2 signal represents even-numbered scanning lines.

According to a first example of the prescribed interlaced-scanning format, the analog B and R signals are outputted in a way as follows. During every odd-numbered field, the analog B and R signals which represent all pixels in the odd-numbered scanning lines are outputted. During every even-numbered field, the analog B and R signals which represent all pixels in the even-numbered scanning lines are outputted.

According to a second example of the prescribed interlaced-scanning format, the analog B and R signals are outputted in a way as follows. During every odd-numbered field, the analog B and R signals which represent odd-numbered pixels in all the scanning lines are outputted. During every even-numbered field, the analog B and R signals which represent even-numbered pixels in all the scanning lines are outputted.

An analog-to-digital (A/D) converter 511 receives the analog G1, B, R, and G2 signals from the solid-state imager 500. A signal source (not shown) outputs a sampling clock signal to the A/D converter 511. The sampling clock signal has a predetermined frequency equal to about 74 MHz. The A/D converter 511 changes the analog G1, B, R, and G2 signals into corresponding parallel-form digital G1, B, R, and G2 signals in response to the sampling clock signal. Specifically, the A/D converter 511 periodically samples the analog G1, B, R, and G2 signals in response to the sampling clock signal, and converts the resultant analog samples into parallel-form digital samples each having 10 bits. The parallel-form digital G1, B, R, and G2 signals relate to a predetermined sampling frequency equal to about 74 MHz. The A/D converter 511 outputs the parallel-form digital G1, B, R, and G2 signals.

In the transmitter of FIG. 7, a signal converter 513 receives the parallel-form digital G1, B, and R signals from the A/D converter 511. The signal converter 513 changes a set of the parallel-form digital G1, B, and R signals into a set of a parallel-form digital luminance signal Y1, a parallel-form digital blue-related color-difference signal Pb1, and a parallel-form digital red-related color-difference signal Pr1. Every sample of the parallel-form digital luminance signal Y1 has 10 bits. Every sample of the parallel-form digital color-difference signal Pb1 has 10 bits. Every sample of the parallel-form digital color-difference signal Pr1 has 10 bits. The parallel-form digital luminance signal Y1 relates to the predetermined sampling-frequency equal to about 74 MHz. The parallel-form digital color-difference signals Pb1 and Pr1 relate to a predetermined sampling frequency equal to about 37 MHz. The signal converter 513 outputs the parallel-form digital luminance signal Y1 and the parallel-form digital color-difference signals Pb1 and Pr1.

A signal converter 523 receives the parallel-form digital G2, B, and R signals from the A/D converter 511. The signal converter 523 changes a set of the parallel-form digital G2, B, and R signals into a set of a parallel-form digital luminance signal Y2, a parallel-form digital blue-related color-difference signal Pb2, and a parallel-form digital red-related color-difference signal Pr2. Every sample of the parallel-form digital luminance signal Y2 has 10 bits. Every sample of the parallel-form digital color-difference signal Pb2 has 10 bits. Every sample of the parallel-form digital color-difference signal Pr2 has 10 bits. The parallel-form digital luminance signal Y2 relates to the predetermined sampling frequency equal to about 74 MHz. The parallel-form digital color-difference signals Pb2 and Pr2 relate to the predetermined sampling frequency equal to about 37 MHz. The signal converter 523 outputs the parallel-form digital luminance signal Y2 and the parallel-form digital color-difference signals Pb2 and Pr2.

In the transmitter of FIG. 7, a multiplexer 514 receives the parallel-form digital luminance signal Y1 and the parallel-form digital color-difference signals Pb I and Pr1 from the signal converter 513. The multiplexer 514 combines the parallel-form digital color-difference signals Pb1 and Pr1 into a multiplexed parallel-form digital color-difference signal Pb1/Pr1 through multiplexing on a time sharing basis. Every sample of the parallel-form digital color-difference signal Pb1/Pr1 has 10 bits. The parallel-form digital color-difference signal Pb1/Pr1 relates to the predetermined sampling frequency equal to about 74 MHz. The multiplexer 514 outputs the parallel-form digital color-difference signal Pb1/Pr1. The parallel-form digital luminance signal Y1 passes through the multiplexer 514. Thus, the multiplexer 514 outputs the parallel-form digital luminance signal Y1. Preferably, the multiplexer 514 includes a suitable circuit designed to match timings of the output signals Y1 and Pb1/Pr1.

A multiplexer 524 receives the parallel-form digital luminance signal Y2 and the parallel-form digital color-difference signals Pb2 and Pr2 from the signal converter 523. The multiplexer 524 combines the parallel-form digital color-difference signals Pb2 and Pr2 into a multiplexed parallel-form digital color-difference signal Pb2/Pr2 through multiplexing on a time sharing basis. Every sample of the parallel-form digital color-difference signal Pb2/Pr2 has 10 bits. The parallel-form digital color-difference signal Pb2/Pr2 relates to the predetermined sampling frequency equal to about 74 MHz. The multiplexer 524 outputs the parallel-form digital color-difference signal Pb2/Pr2. The parallel-form digital luminance signal Y2 passes through the multiplexer 524. Thus, the multiplexer 524 outputs the parallel-form digital luminance signal Y2. Preferably, the multiplexer 524 includes a suitable circuit designed to match timings of the output signals Y2 and Pb2/Pr2.

In the transmitter of FIG. 7, a parallel-to-serial (P/S) converter 515 receives the parallel-form digital luminance signal Y1 and the parallel-form digital color-difference signal Pb1/Pr1 from the multiplexer 514. The P/S converter 515 changes and multiplexes the parallel-form digital luminance signal Y1 and the parallel-form digital color-difference signal Pb1/Pr1 into a serial-form digital composite signal (a bit stream) Y1/Pb1/Pr1 related to a predetermined sampling frequency equal to about 1.5 GHz. The P/S converter 515 outputs the serial-form digital composite signal Y1/Pb1/Pr1.

A P/S converter 525 receives the parallel-form digital luminance signal Y2 and the parallel-form digital color-difference signal Pb2/Pr2 from the multiplexer 524. The P/S converter 525 changes and multiplexes the parallel-form digital luminance signal Y2 and the parallel-form digital color-difference signal Pb2/Pr2 into a serial-form digital composite signal (a bit stream) Y2/Pb2/Pr2 related to the predetermined sampling frequency equal to about 1.5 GHz. The P/S converter 525 outputs the serial-form digital composite signal Y2/Pb2/Pr2.

In the transmitter of FIG. 7, an electric-to-optical (E/O) converter 517 receives the serial-form digital composite signal Y1/Pb1/Pr1 from the P/S converter 515. The E/O converter 517 changes the serial-form digital composite signal Y1/Pb1/Pr1 into a corresponding optical signal having a predetermined wavelength "α". The E/O converter 517 outputs the α-related optical signal.

An E/O converter 527 receives the serial-form digital composite signal Y2/Pb2/Pr2 from the P/S converter 525. The E/O converter 527 changes the serial-form digital composite signal Y2/Pb2/Pr2 into a corresponding optical signal having a predetermined wavelength "β". The E/O converter 527 outputs the β-related optical signal.

In the transmitter of FIG. 7, an optical multiplexer 530 receives the α-related optical signal and the β-related optical signal from the E/O converters 517 and 527. The optical multiplexer 530 combines the α-related optical signal and the β-related optical signal into a multiplexing-resultant optical signal through wavelength division multiplexing. The optical multiplexer 530 outputs the multiplexing-resultant optical signal to an optical transmission line or an optical fiber cable 540. The multiplexing-resultant optical signal propagates along the optical fiber cable 540.

The imaging system according to the third embodiment of this invention includes a receiver (a camera control unit or a CCU) which is similar to the receiver of FIG. 6. The receiver in the third embodiment of this invention receives an optical signal from the optical fiber cable 540. The receiver converts the optical signal into a parallel-form digital luminance signal Y, a parallel-form digital color-difference signal Pb, and a parallel-form digital color-difference signal Pr.

Fourth Embodiment

Figure 8:
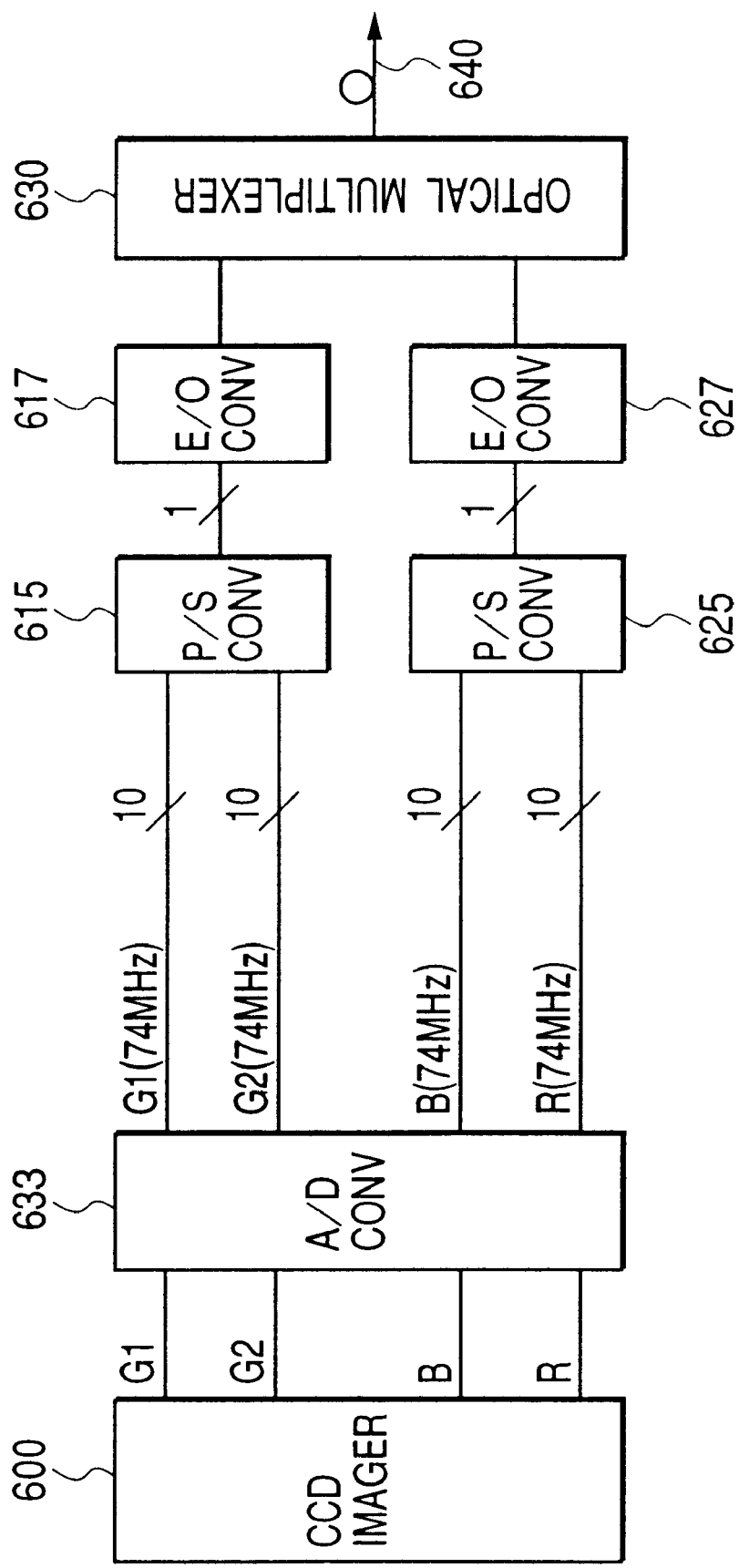
FIG. 8 is a block diagram of a transmitter (a camera head) in an imaging system according to a fourth embodiment of this invention.

FIG. 8 shows a transmitter (a camera head) in an imaging system according to a fourth embodiment of this invention. With reference to FIG. 8, a solid-state imager 600 is a CCD camera having four chips or plates for first green (G1), blue (B), red (R), and second green (G2) respectively. The solid-state imager 600 is similar to the solid-state imager 500 in FIG. 7. The solid-state imager 600 outputs analog first-green, blue, red, and second-green signals (analog G1, B, R, and G2 signals) in a prescribed interlaced-scanning format.

An analog-to-digital (A/D) converter 633 receives the analog G1, B, R, and G2 signals from the solid-state imager 600. A signal source (not shown) outputs a sampling clock signal to the A/D converter 633. The sampling clock signal has a predetermined frequency equal to about 74 MHz. The A/D converter 633 changes the analog G1, B, R, and G2 signals into corresponding parallel-form digital G1, B, R, and G2 signals in response to the sampling clock signal. Specifically, the A/D converter 633 periodically samples the analog G1, B, R, and G2 signals in response to the sampling clock signal, and converts the resultant analog samples into parallel-form digital samples each having 10 bits. The parallel-form digital G1, B, R, and G2 signals relate to a predetermined sampling frequency equal to about 74 MHz. The A/D converter 633 outputs the parallel-form digital G1, B, R, and G2 signals.

In the transmitter of FIG. 8, a parallel-to-serial (P/S) converter 615 receives the parallel-form digital G1 and G2 signals from the A/D converter 633. The P/S converter 615 changes and multiplexes the parallel-form digital G1 and G2 signals into a serial-form digital G signal (a bit stream) related to a predetermined sampling frequency equal to about 1.5 GHz. The P/S converter 615 outputs the serial-form digital G signal.

A P/S converter 625 receives the parallel-form digital B and R signals from the A/D converter 633. The P/S converter 625 changes and multiplexes the parallel-form digital B and R signals into a serial-form digital B&R signal (a bit stream) related to the predetermined sampling frequency equal to about 1.5 GHz. The P/S converter 625 outputs the serial-form digital B&R signal.

In the transmitter of FIG. 8, an electric-to-optical (E/O) converter 617 receives the serial-form digital G signal from the P/S converter 615. The E/O converter 617 changes the serial-form digital G signal into a corresponding optical signal having a predetermined wavelength "α". The E/O converter 617 outputs the α-related optical signal.

An E/O converter 627 receives the serial-form digital B&R signal from the P/S converter 625. The E/O converter 627 changes the serial-form digital B&R signal into a corresponding optical signal having a predetermined wavelength "β". The E/O converter 627 outputs the β-related optical signal.

In the transmitter of FIG. 8, an optical multiplexer 630 receives the α-related optical signal and the β-related optical signal from the E/O converters 617 and 627. The optical multiplexer 630 combines the α-related optical signal and the β-related optical signal into a multiplexing-resultant optical signal through wavelength division multiplexing. The optical multiplexer 630 outputs the multiplexing-resultant optical signal to an optical transmission line or an optical fiber cable 640. The multiplexing-resultant optical signal propagates along the optical fiber cable 640.

Figure 9:
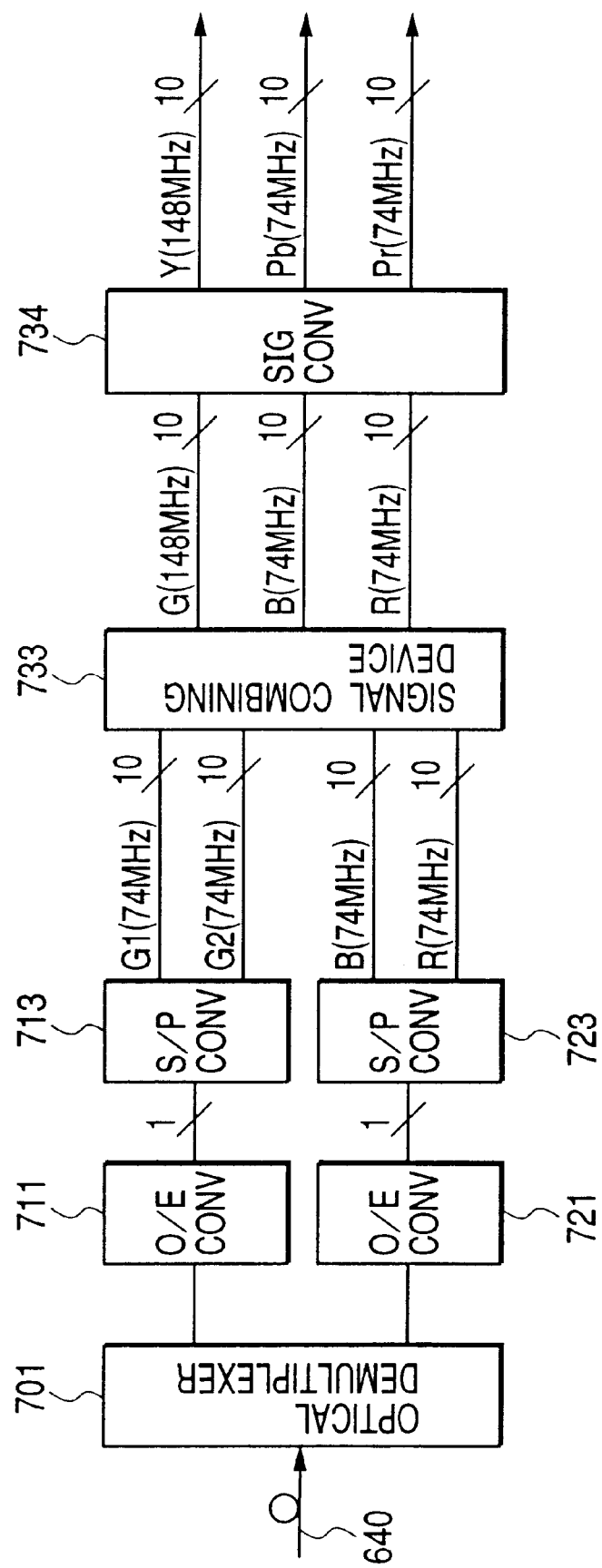
FIG. 9 is a block diagram of a receiver (a camera control unit or a CCU) in the imaging system according to the fourth embodiment of this invention.

FIG. 9 shows a receiver (a camera control unit or a CCU) in the imaging system according to the fourth embodiment of this invention. With reference to FIG. 9, an optical demultiplexer 701 receives an optical signal from the optical fiber cable 640. The optical demultiplexer 701 separates the received optical signal into an optical signal having the predetermined wavelength "α" and an optical signal having the predetermined wavelength "β". The optical demultiplexer 701 outputs the α-related optical signal and the β-related optical signal.

In the receiver of FIG. 9, an optical-to-electric (O/E) converter 711 receives the α-related optical signal from the optical demultiplexer 701. The O/E converter 711 changes the α-related optical signal into a corresponding serial-form digital G signal related to the predetermined sampling frequency equal to about 1.5 GHz. The O/E converter 711 outputs the serial-form digital G signal.

An O/E converter 721 receives the β-related optical signal from the optical demultiplexer 701. The O/E converter 721 changes the β-related optical signal into a corresponding serial-form digital B&R signal related to the predetermined sampling frequency equal to about 1.5 GHz. The O/E converter 721 outputs the serial-form digital B&R signal.

In the receiver of FIG. 9, a serial-to-parallel (S/P) converter 713 receives the serial-form digital G signal from the O/E converter 711. The S/P converter 713 changes and divides (demultiplexes) the serial-form digital G signal into a parallel-form digital G1 signal and a parallel-form digital G2 signal. Every sample of the parallel-form digital G1 signal has 10 bits. Every sample of the parallel-form digital G2 signal has 10 bits. The parallel-form digital G1 and G2 signals relate to the predetermined sampling frequency equal to about 74 MHz. The S/P,converter 713 outputs the parallel-form digital G1 and G2 signals.

An S/P converter 723 receives the serial-form digital B&R signal from the O/E converter 721. The S/P converter 723 changes and divides (demultiplexes) the serial-form digital B&R signal into a parallel-form digital B signal and a parallel-form digital R signal. Every sample of the parallel-form digital B signal has 10 bits. Every sample of the parallel-form digital R signal has 10 bits. The parallel-form digital B and R signals relate to the predetermined sampling frequency equal to about 74 MHz. The S/P converter 723 outputs the parallel-form digital B and R signals.

In the receiver of FIG. 9, a signal combining device 733 receives the parallel-form digital G1 and G2 signals from the S/P converter 713. The signal combining device 733 multiplexes the parallel-form digital G1 and G2 signals into a multiplexed parallel-form digital G signal related to a predetermined sampling frequency equal to about 148 MHz. Every sample of the parallel-form digital G signal has 10 bits. The signal combining device 733 outputs the parallel-form digital G signal. The signal combining device 733 receives the parallel-form digital B and R signals from the S/P converter 723. The parallel-form digital B and R signals pass through the signal combining device 733. Thus, the signal combining device 733 outputs the parallel-form digital B and R signals. Preferably, the signal combining device 733 includes a suitable circuit designed to match timings of the parallel-form digital G, B, and R signals outputted therefrom.

A signal converter 734 receives the parallel-form digital G, B, and R signals from the signal combining device 733. The signal converter 734 changes a set of the parallel-form digital G, B, and R signals into a set of a parallel-form digital luminance signal Y, a parallel-form digital blue-related color-difference signal Pb, and a parallel-form digital red-related color-difference signal Pr. Every sample of the parallel-form digital luminance signal Y has 10 bits. Every sample of the parallel-form digital color-difference signal Pb has 10 bits. Every sample of the parallel-form digital color-difference signal Pr has 10 bits. The parallel-form digital luminance signal Y relates to the predetermined sampling frequency equal to about 148 MHz. The parallel-form digital color-difference signals Pb and Pr relate to a predetermined sampling frequency equal to about 74 MHz. The signal converter 734 outputs the parallel-form digital luminance signal Y and the parallel-form digital color-difference signals Pb and Pr.

Fifth Embodiment

An imaging system according to a fifth embodiment of this invention includes a transmitter (a camera head) which is similar to the transmitter of FIG. 8.

Figure 10:
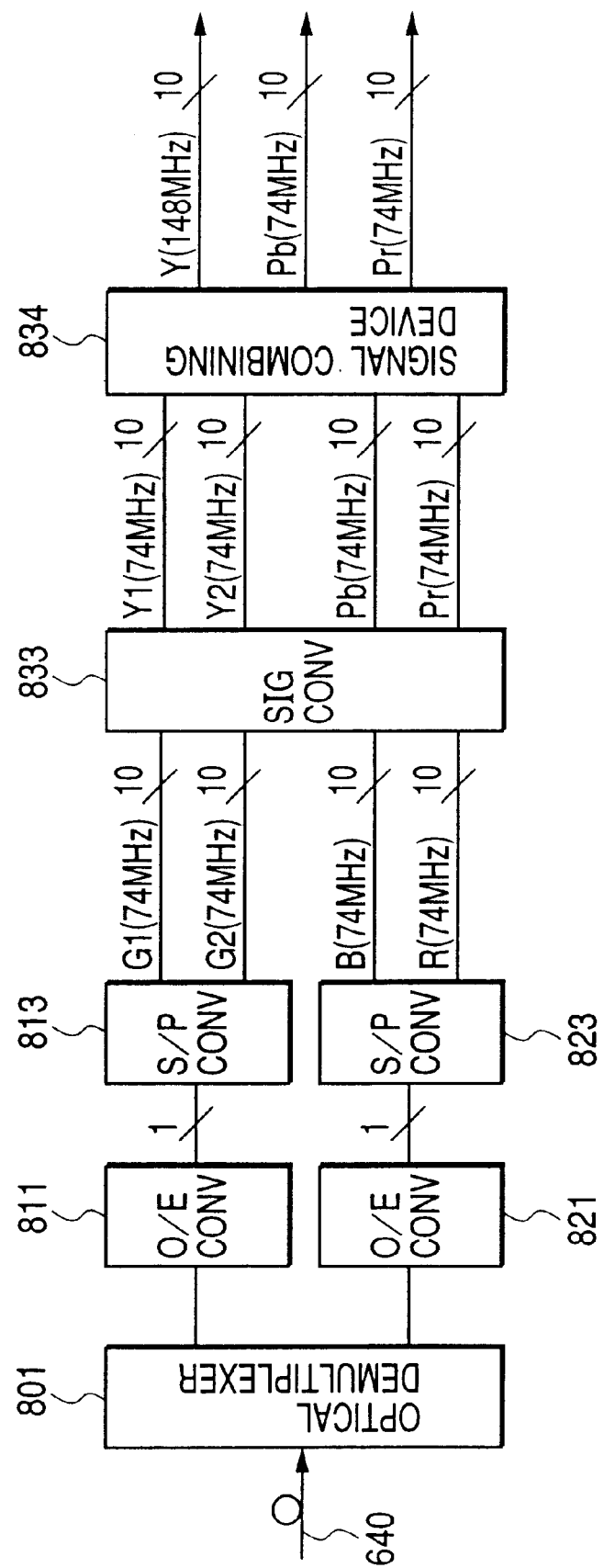
FIG. 10 is a block diagram of a receiver (a camera control unit or a CCU) in an imaging system according to a fifth embodiment of this invention.

FIG. 10 shows a receiver (a camera control unit or a CCU) in the imaging system according to the fifth embodiment of this invention. With reference to FIG. 10, an optical demultiplexer 801 receives an optical signal from the optical fiber cable 640. The optical demultiplexer 801 separates the received optical signal into an optical signal having the predetermined wavelength "α" and an optical signal having the predetermined wavelength "β". The optical demultiplexer 801 outputs the α-related optical signal and the ,related optical signal.

In the receiver of FIG. 10, an optical-to-electric (O/E) converter 81 1 receives the α-related optical signal from the optical e demultiplexer 801. The O/E converter 811 changes the α-related optical signal into a corresponding serial-form digital G signal related to the predetermined sampling frequency equal to about 1.5 GHz. The O/E converter 811 outputs the serial-form digital G signal.

An O/E converter 821 receives the β-related optical signal from the optical demultiplexer 801. The O/E converter 821 changes the β-related optical signal into a corresponding serial-form digital B&R signal related to the predetermined sampling frequency equal to about 1.5 GHz. The O/E converter 821 outputs the serial-form digital B&R signal.

In the receiver of FIG. 10, a serial-to-parallel (S/P) converter 813 receives the serial-form digital G signal from the O/E converter 811. The S/P converter 813 changes and divides (demultiplexes) the serial-form digital G signal into a parallel-form digital G1 signal and a parallel-form digital G2 signal. Every sample of the parallel-form digital G1 signal has 10 bits. Every sample of the parallel-form digital G2 signal has 10 bits. The parallel-form digital G1 and G2 signals relate to a predetermined sampling frequency equal to about 74 MHz. The S/P converter 813 outputs the parallel-form digital G1 and G2 signals.

An S/P converter 823 receives the serial-form digital B&R signal from the O/E converter 821. The S/P converter 823 changes and divides (demultiplexes) the serial-form digital B&R signal into a parallel-form digital B signal and a parallel-form digital R signal. Every sample of the parallel-form digital B signal has 10 bits. Every sample of the parallel-form digital R signal has 10 bits. The parallel-form digital B and R signals relate to the predetermined sampling frequency equal to about 74 MHz. The S/P converter 823 outputs the parallel-form digital B and R signals.

In the receiver of FIG. 10, a signal converter 833 receives the parallel-form digital G1 and G2 signals from the S/P converter 813. The signal converter 833 receives the parallel-form digital B and R signals from the S/P converter 823. The signal converter 833 changes a set of the parallel-form digital G1, G2, B, and R signals into a set of a first sub parallel-form digital luminance signal Y1, a second sub parallel-form digital luminance signal Y2, a parallel-form digital blue-related color-difference signal Pb, and a parallel-form digital red-related color-difference signal Pr. Every sample of the first sub parallel-form digital luminance signal Y1 has 10 bits. Every sample of the second sub parallel-form digital luminance signal Y2 has 10 bits. Every sample of the parallel-form digital color-difference signal Pb has 10 bits. Every sample of the parallel-form digital color-difference signal Pr has 10 bits. The sub parallel-form digital luminance signals Y1 and Y2 relate to the predetermined sampling frequency equal to about 74 MHz. The parallel-form digital color-difference signals Pb and Pr relate to the predetermined sampling frequency equal to about 74 MHz. The signal converter 833 outputs the sub parallel-form digital luminance signal Y1 and Y2 and the parallel-form digital color-difference signals Pb and Pr.

A signal combining device 834 receives the sub parallel-form digital luminance signals Y1 and Y2 from the signal converter 833. The signal combining device 834 multiplexes the sub parallel-form digital luminance signals Y1 and Y2 into a multiplexed parallel-form digital luminance signal Y related to a predetermined sampling frequency equal to about 148 MHz. Every sample of the parallel-form digital luminance signal Y has 10 bits. The signal combining device 834 outputs the parallel-form digital luminance signal Y. The signal combining device 834 receives the parallel-form digital color-difference signals Pb and Pr from the signal converter 833. The parallel-form digital color-difference signals Pb and Pr pass through the signal combining device 834. Thus, the signal combining device 834 outputs the parallel-form digital color-difference signals Pb and Pr. Preferably, the signal combining device 834 includes a suitable circuit designed to match timings of the output signals Y, Pb, and Pr.

Sixth Embodiment

Figure 11:
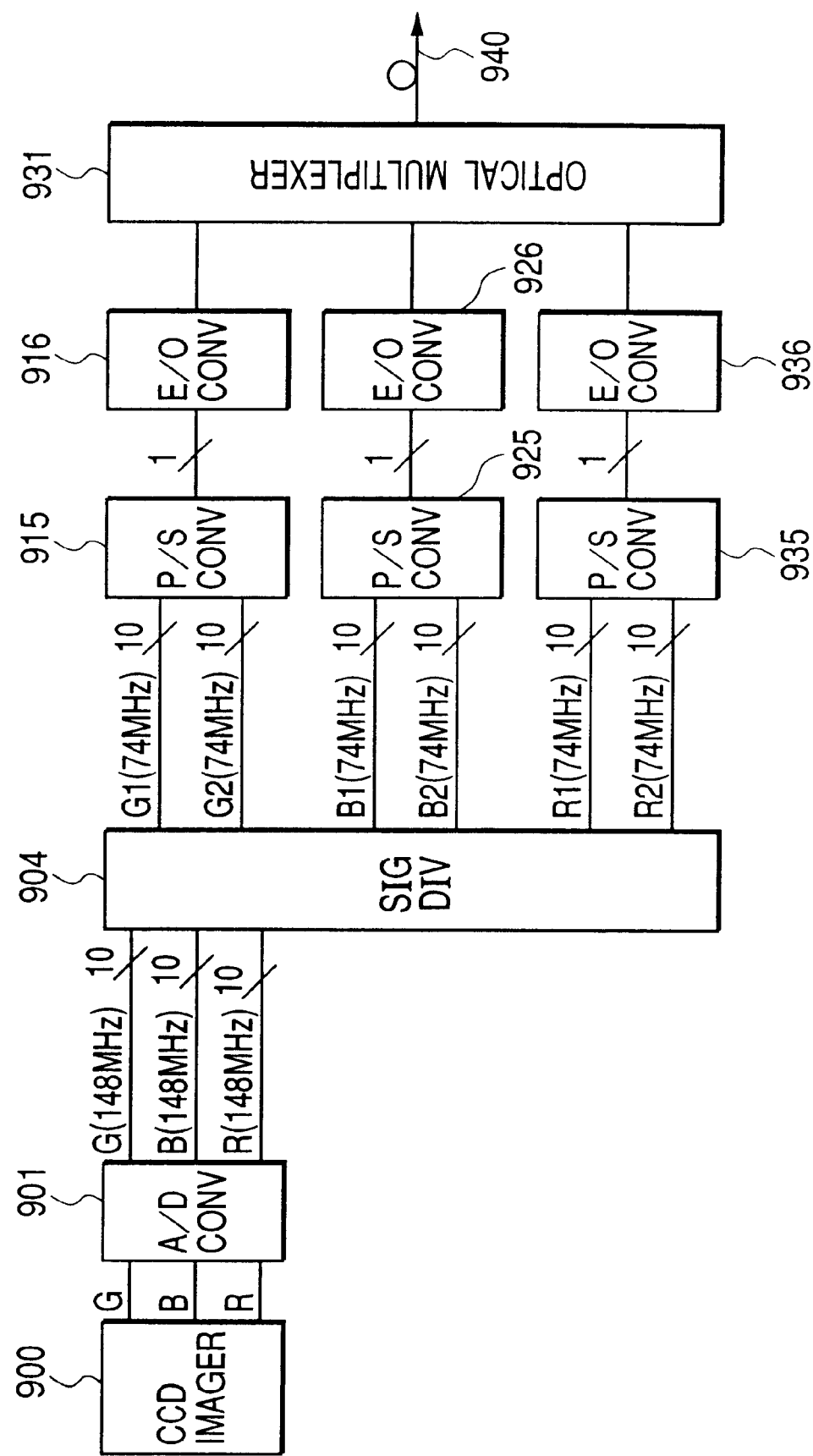
FIG. 11 is a block diagram of a transmitter (a camera head) in an imaging system according to a sixth embodiment of this invention.

FIG. 11 shows a transmitter (a camera head) in an imaging system according to a sixth embodiment of this invention. With reference to FIG. 11, a solid-state imager 900 is a CCD camera having three chips or plates for green (G), blue (B), and red (R) respectively. The solid-state imager 900 outputs analog green, blue, and red signals (analog G, B, and R signals) in a prescribed progressive-scanning format designed such that every frame is composed of 1,125 horizontal scanning lines.

An analog-to-digital (A/D) converter 901 receives the analog G, B, and R signals from the solid-state imager 900. A signal source (not shown) outputs a sampling clock signal to the A/D converter 901. The sampling clock signal has a predetermined frequency equal to about 148 MHz. The A/D converter 901 changes the analog G, B, and R signals into corresponding parallel-form digital G, B, and R signals in response to the sampling clock signal. Specifically, the A/D converter 901 periodically samples the analog G, B, and R signals in response to the sampling clock signal, and converts the resultant analog samples into parallel-form digital samples each having 10 bits. The parallel-form digital G, B, and R signals relate to a predetermined sampling frequency equal to about 148 MHz. The A/D converter 901 outputs the parallel-form digital G, B, and R signals.

In the transmitter of FIG. 11, a signal divider 904 receives the parallel-form digital G, B, and R signals from the A/D converter 901. The signal divider 904 separates (demultiplexes) the parallel-form digital G signal into a first sub parallel-form digital green signal G1 and a second sub parallel-form digital green signal G2 on a time sharing basis. Every sample of the first sub parallel-form digital green signal G1 has 10 bits. Every sample of the second sub parallel-form digital green signal G2 has 10 bits. The sub parallel-form digital green signals G1 and G2 relate to the predetermined sampling frequency equal to about 74 MHz. The signal divider 904 outputs the sub parallel-form digital green signals G1 and G2. The signal divider 904 separates (demultiplexes) the parallel-form digital B signal into a first sub parallel-form digital blue signal B1 and a second sub parallel-form digital blue signal B2 on a time sharing basis. Every sample of the first sub parallel-form digital blue signal B11 has 10 bits. Every sample of the second sub parallel-form digital blue signal B2 has 10 bits. The sub parallel-form digital blue signals B1 and B2 relate to the predetermined sampling frequency equal to about 74 MHz. The signal divider 904 outputs the sub parallel-form digital blue signals B13 and B2. The signal divider 904 separates (demultiplexes) the parallel-form digital R signal into a first sub parallel-form digital red signal R1 and a second sub parallel-form digital red signal R2 on a time sharing basis. Every sample of the first sub parallel-form digital red signal R1 has 10 bits. Every sample of the second sub parallel-form digital red signal R2 has 10 bits. The sub parallel-form digital red signals R1 and R2 relate to the predetermined sampling frequency equal to about 74 MHz. The signal divider 904 outputs the sub parallel-form digital red signals R1 and R2.

In the transmitter of FIG. 11, a parallel-to-serial (P/S) converter 915 receives the sub parallel-form digital green signals G1 and G2 from the signal divider 904. The P/S converter 915 changes and multiplexes the sub parallel-form digital green signals G1 and G2 into a serial-form digital G signal (a bit stream) related to a predetermined sampling frequency equal to about 1.5 GHz. The P/S converter 915 outputs the serial-form digital G signal.

A P/S converter 925 receives the sub parallel-form digital blue signals B1 and B2 from the signal divider 904. The P/S converter 925 changes and multiplexes the sub parallel-form digital blue signals B1 and B2 into a serial-form digital B signal (a bit stream) related to the predetermined sampling frequency equal to about 1.5 GHz. The P/S converter 925 outputs the serial-form digital B signal.

A P/S converter 935 receives the sub parallel-form digital red signals R1 and R2 from the signal divider 904. The P/S converter 935 changes and multiplexes the sub parallel-form digital red signals R1 and R2 into a serial-form digital R signal (a bit stream) related to the predetermined sampling frequency equal to about 1.5 GHz. The P/S converter 935 outputs the serial-form digital B signal. In the transmitter of FIG. 11, an electric-to-optical (E/O) converter 916 receives the serial-form digital G signal from the P/S converter 915. The E/O converter 916 changes the serial-form digital G signal into a corresponding optical signal having a predetermined wavelength "α". The E/O converter 916 outputs the α-related optical signal.

An E/O converter 926 receives the serial-form digital B signal from the P/S converter 925. The E/O converter 926 changes the serial-form digital B signal into a corresponding optical signal having a predetermined wavelength "β" different from the predetermined wavelength "α". The E/O converter 926 outputs the β-related optical signal.

An E/O converter 936 receives the serial-form digital R signal from the P/S converter 935. The E/O converter 936 changes the serial-form digital R signal into a corresponding optical signal having a predetermined wavelength "γ" different from the predetermined wavelength "α" and the predetermined wavelength "β". The E/O converter 936 outputs the γ-related optical signal.

In the transmitter of FIG. 11, an optical multiplexer 931 receives the α-related optical signal, the β-related optical signal, and the γ-related optical signal from the E/O converters 916, 926, and 936. The optical multiplexer 931 combines the α-related optical signal, the β-related optical signal, and the γ-related optical signal into a multiplexing-resultant optical signal through wavelength division multiplexing. The optical multiplexer 931 outputs the multiplexing-resultant optical signal to an optical transmission line or an optical fiber cable 940. The multiplexing-resultant optical signal propagates along the optical fiber cable 940.

Figure 12:
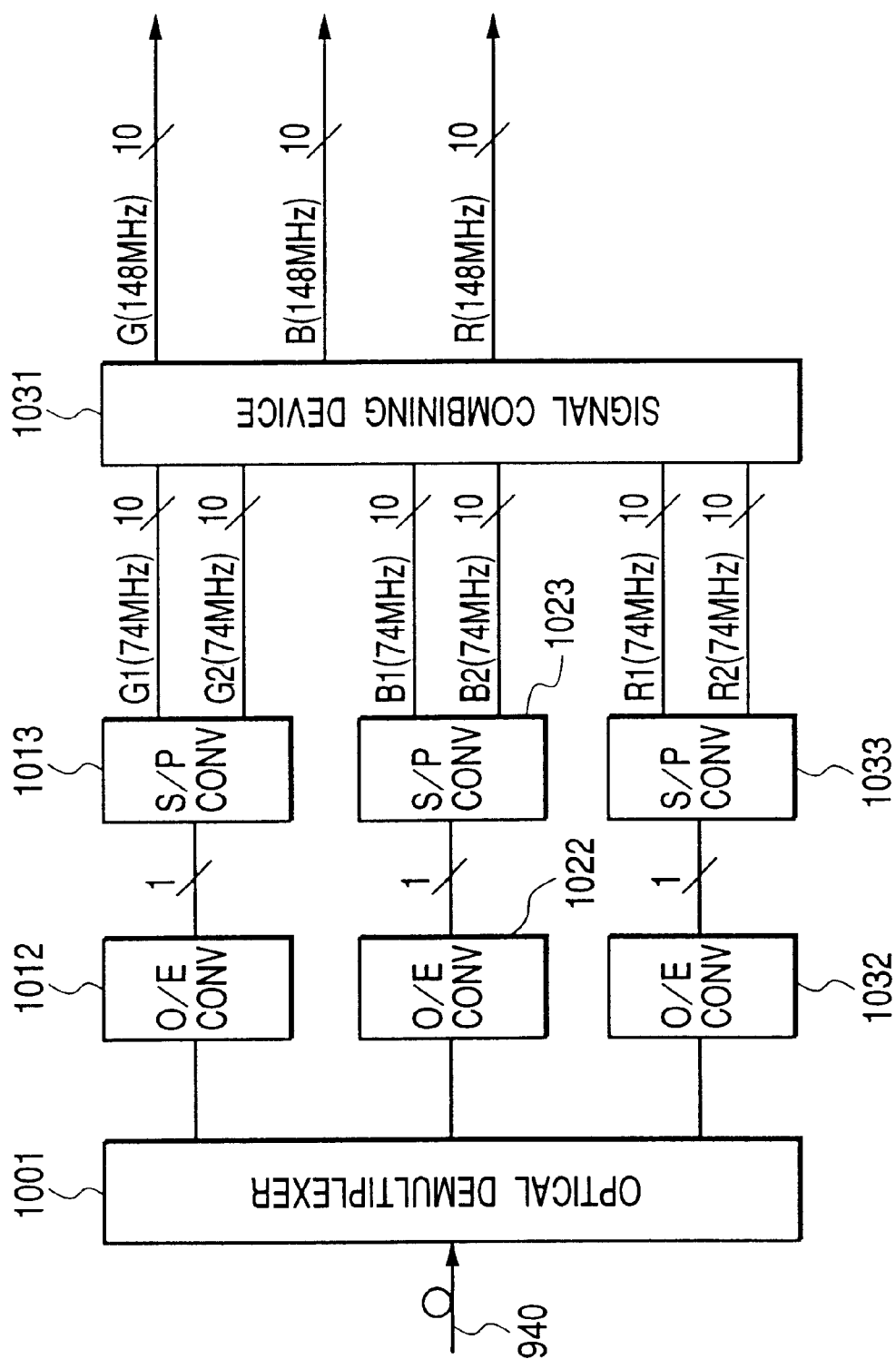
FIG. 12 is a block diagram of a receiver (a camera control unit or a CCU) in the imaging system according to the sixth embodiment of this invention.

FIG. 12 shows a receiver (a camera control unit or a CCU) in the imaging system according to the sixth embodiment of this invention. With reference to FIG. 12, an optical demultiplexer 1001 receives an optical signal from the optical fiber cable 940. The optical demultiplexer 1001 separates the received optical signal into an optical signal having the predetermined wavelength "α", an optical signal having the predetermined wavelength "β", and an optical signal having the predetermined wavelength "γ". The optical demultiplexer 1001 outputs the α-related optical signal, the β-related optical signal, and the γ-related optical signal.

In the receiver of FIG. 12, an optical-to-electric (O/E) converter 1012 receives the α-related optical signal from the optical demultiplexer 1001. The O/E converter 1012 changes the α-related optical signal into a corresponding serial-form digital G signal related to the predetermined sampling frequency equal to about 1.5 GHz. The O/E converter 1012 outputs the serial-form digital G signal.

An O/E converter 1022 receives the β-related optical signal from the optical demultiplexer 1001. The O/E converter 1022 changes the β-related optical signal into a corresponding serial-form digital B signal related to the predetermined sampling frequency equal to about 1.5 GHz. The O/E converter 1022 outputs the serial-form digital B signal.

An O/E converter 1032 receives the γ-related optical signal from the optical demultiplexer 1001. The O/E converter 1032 changes the γ-related optical signal into a corresponding serial-form digital R signal related to the predetermined sampling frequency equal to about 1.5 GHz. The O/E converter 1032 outputs the serial-form digital R signal.

In the receiver of FIG. 12, a serial-to-parallel (S/P) converter 1013 receives the serial-form digital G signal from the O/E converter 1012. The S/P converter 1013 changes and divides (demultiplexes) the serial-form digital G signal into a first sub parallel-form digital green signal G1 and a second sub parallel-form digital green signal G2. Every sample of the first sub parallel-form digital green signal G1 has 10 bits. Every sample of the second sub parallel-form digital green signal G2 has 10 bits. The sub parallel-form digital green signals G1 and G2 relate to the predetermined sampling frequency equal to about 74 MHz. The S/P converter 1013 outputs the sub parallel-form digital green signals G1 and G2.

An S/P converter 1023 receives the serial-form digital B signal from the O/E converter 1022. The S/P converter 1023 changes and divides (demultiplexes) the serial-form digital B signal into a first sub parallel-form digital blue signal B1 and a second sub parallel-form digital blue signal B2. Every sample of the first sub parallel-form digital blue signal B1 has 10 bits. Every sample of the second sub parallel-form digital blue signal B2 has 10 bits. The sub parallel-form digital blue signals B1 and B2 relate to the predetermined sampling frequency equal to about 74 MHz. The S/P converter 1023 outputs the sub parallel-form digital blue signals B1 and B2.

An S/P converter 1033 receives the serial-form digital R signal from the O/E converter 1032. The S/P converter 1033 changes and divides (demultiplexes) the serial-form digital R signal into a first sub parallel-form digital red signal R1 and a second sub parallel-form digital red signal R2. Every sample of the first sub parallel-form digital red signal R1 has 10 bits. Every sample of the second sub parallel-form digital red signal R2 has 10 bits. The sub parallel-form digital red signals R1 and R2 relate to the predetermined sampling frequency equal to about 74 MHz. The S/P converter 1033 outputs the sub parallel-form digital red signals R1 and R2.

In the receiver of FIG. 12, a signal combining device 1031 receives the sub parallel-form digital green signals G1 and G2 from the S/P converter 1013. The signal combining device 1031 multiplexes the sub parallel-form digital green signals G1 and G2 into a parallel-form 10-bit digital G signal related to the predetermined sampling frequency equal to about 148 MHz. In this way, the parallel-form digital G signal is recovered. The signal combining device 1031 outputs the parallel-form digital G signal. The signal combining device 1031 receives the sub parallel-form digital blue signals B1 and B2 from the S/P converter 1023. The signal combining device 1031 multiplexes the sub parallel-form digital blue signals B1 and B2 into a parallel-form 10-bit digital B signal related to the predetermined sampling frequency equal to about 148 MHz. In this way, the parallel-form digital B signal is recovered. The signal combining device 1031 outputs the parallel-form digital B signal. The signal combining device 1031 receives the sub parallel-form digital red signals R1 and R2 from the S/P converter 1033. The signal combining device 1031 multiplexes the sub parallel-form digital red signals R1 and R2 into a parallel-form 10-bit digital R signal related to the predetermined sampling frequency equal to about 148 MHz. In this way, the parallel-form digital R signal is recovered. The signal combining device 1031 outputs the parallel-form digital R signal.

In the transmitter of FIG. 11, since the input signals to the P/S converters 915, 925, and 935 relate to a sampling frequency of about 74 MHz, it is unnecessary to provide special P/S converters capable of processing input signals related to a sampling frequency of about 148 MHz. In the receiver of FIG. 12, since the output signals from the S/P converters 1013, 1023, and 1033 relate to a sampling frequency of about 74 MHz, it is unnecessary to provide special S/P converters capable of outputting signals related to a sampling frequency of about 148 MHz.

What is claimed is:

1. An imaging system comprising:

an imager outputting an analog green signal, an analog blue signal, and an analog red signal in a predetermined progressive-scanning format;

an analog-to-digital converter converting the analog green signal, the analog blue signal, and the analog red signal into a parallel-form digital green signal, a parallel-form digital blue signal, and a parallel-form digital red signal, respectively;

a signal converter converting a set of the parallel-form digital green signal, the parallel-form digital blue signal, and the parallel-form digital red signal into- a set of a parallel-form digital luminance signal, a first parallel-form digital color-difference signal, and a second parallel-form digital color-difference signal;

a signal divider separating the parallel-form digital luminance signal into a first sub parallel-form digital luminance signal and a second sub parallel-form digital luminance signal;

a first parallel-to-serial converter converting the first and second sub parallel-form digital luminance signals into a serial-form digital luminance signal;

a second parallel-to-serial converter converting the first and second parallel-form digital color-difference signals into a serial-form digital color-difference signal;

a first electric-to-optical converter converting the serial-form digital luminance signal into a first optical signal having a first predetermined wavelength;

a second electric-to-optical converter converting the serial-form digital color-difference signal into a second optical signal having a second predetermined wavelength different from the first predetermined wavelength; and an optical multiplexer multiplexing the first optical signal and the second optical signal into a multiplexed optical signal, and outputting the multiplexed optical signal to an optical transmission line.

2. An imaging system as recited in claim 1, further comprising:

an optical demultiplexer receiving the multiplexed optical signal from the optical transmission line, and demultiplexing the multiplexed optical signal into the first optical signal and the second optical signal;

a first optical-to-electric converter converting the first optical signal generated by the optical demultiplexer into the serial-form digital luminance signal;

a second optical-to-electric converter converting the second optical signal generated by the optical demultiplexer into the serial-form digital color-difference signal;

a first serial-to-parallel converter converting the serial-form digital luminance signal generated by the first optical-to-electric converter into the first and second sub parallel-form digital luminance signals;

a second serial-to-parallel converter converting the serial-form digital color-difference signal generated by the second optical-to-electric converter into the first and second parallel-form digital color-difference signals; and a signal combining device multiplexing the first and second sub parallel-form digital luminance signals generated by the first serial-to-parallel converter into the parallel-form digital luminance signal.

3. An imaging system comprising:

an imager outputting an analog green signal, an analog blue signal, and an analog red signal in a predetermined progressive-scanning format;

a signal source generating a first sampling clock signal having a predetermined frequency;

a delay device delaying the first sampling clock signal into a second sampling clock signal by a time equal to half a period of the first sampling clock signal;

a first analog-to-digital converter converting the analog green signal, the analog blue signal, and the analog red signal into a first parallel-form digital green signal, a first parallel-form digital blue signal, and a first parallel-form digital red signal in response to the first sampling clock signal, respectively;

a second analog-to-digital converter converting the analog green signal, the analog blue signal, and the analog red signal into a second parallel-form digital green signal, a second parallel-form digital blue signal, and a second parallel-form digital red signal in response to the second sampling clock signal, respectively;

a first signal converter converting a set of the first parallel-form digital green signal, the first parallel-form digital blue signal, and the first parallel-form digital red signal into a set of a first parallel-form digital luminance signal, a first parallel-form digital color-difference signal, and a second parallel-form digital color-difference signal;

a second signal converter converting a set of the second parallel-form digital green signal, the second parallel-form digital blue signal, and the second parallel-form digital red signal into a set of a second parallel-form digital luminance signal, a third parallel-form digital color-difference signal, and a fourth parallel-form digital color-difference signal;

a first electric multiplexer multiplexing the first and second parallel-form digital color-difference signals into a first multiplexed parallel-form digital color-difference signal;

a second electric multiplexer multiplexing the third and fourth parallel-form digital color-difference signals into a second multiplexed parallel-form digital color-difference signal;

a first parallel-to-serial converter converting the first parallel-form digital luminance signal and the first multiplexed parallel-form digital color-difference signal into a first serial-form digital composite signal;

a second parallel-to-serial converter converting the second parallel-form digital luminance signal and the second multiplexed parallel-form digital color-difference signal into a second serial-form digital composite signal;

a first electric-to-optical converter converting the first serial-form digital composite signal into a first optical signal having a first predetermined wavelength;

a second electric-to-optical converter converting the second serial-form digital composite signal into a second optical signal having a second predetermined wavelength different from the first predetermined wavelength; and an optical multiplexer multiplexing the first optical signal and the second optical signal into a multiplexed optical signal, and outputting the multiplexed optical signal to an optical transmission line.

4. An imaging system as recited in claim 3, further comprising:

an optical demultiplexer receiving the multiplexed optical signal from the optical transmission line, and demultiplexing the multiplexed optical signal into the first optical signal and the second optical signal;

a first optical-to-electric converter converting the first optical signal generated by the optical demultiplexer into the first serial-form digital composite signal;

a second optical-to-electric converter converting the second optical signal generated by the optical demultiplexer into the second serial-form digital composite signal;

a first serial-to-parallel converter converting the first serial-form digital composite signal generated by the first optical-to-electric converter into the first parallel-form digital luminance signal and the first multiplexed parallel-form digital color-difference signal;

a second serial-to-parallel converter converting the second serial-form digital composite signal generated by the second optical-to-electric converter into the second parallel-form digital luminance signal and the second multiplexed parallel-form digital color-difference signal;

a first electric demultiplexer demultiplexing the first multiplexed parallel-form digital color-difference signal generated by the first serial-to-parallel converter into the first and second parallel-form digital color-difference signals;

a second electric demultiplexer demultiplexing the second multiplexed parallel-form digital color-difference signal generated by the second serial-to-parallel converter into the third and fourth parallel-form digital color-difference signals; and a signal combining device multiplexing the first parallel-form digital luminance signal generated by the first serial-to-parallel converter and the second parallel-form digital luminance signal generated by the second serial-to-parallel converter into a multiplexed parallel-form digital luminance signal, multiplexing the first parallel-form digital color-difference signal generated by the first electric demultiplexer and the third parallel-form digital color-difference signal generated by the second electric demultiplexer into a first multiplexed parallel-form digital color-difference signal, and multiplexing the second parallel-form digital color-difference signal generated by the first electric demultiplexer and the fourth parallel-form digital color-difference signal generated by the second electric demultiplexer into a second multiplexed parallel-form digital color-difference signal.

5. An imaging system comprising:

an imager outputting a first analog green signal, a second analog green signal, an analog blue signal, and an analog red signal in a predetermined interlaced-scanning format;

an analog-to-digital converter converting the first analog green signal, the second analog green signal, the analog blue signal, and the analog red signal into a first parallel-form digital green signal, a second parallel-form digital green signal, a parallel-form digital blue signal, and a parallel-form digital red signal, respectively;

a first signal converter converting a set of the first parallel-form digital green signal, the parallel-form digital blue signal, and the parallel-form digital red signal into a set of a first parallel-form digital luminance signal, a first parallel-form digital color-difference signal, and a second parallel-form digital color-difference signal;

a second signal converter converting a set of the second parallel-form digital green signal, the parallel-form digital blue signal, and the parallel-form digital red signal into a set of a second parallel-form digital luminance signal, a third parallel-form digital color-difference signal, and a fourth parallel-form digital color-difference signal;

a first electric multiplexer multiplexing the first and second parallel-form digital color-difference signals into a first multiplexed parallel-form digital color-difference signal;

a second electric multiplexer multiplexing the third and fourth parallel-form digital color-difference signals into a second multiplexed parallel-form digital color-difference signal;

a first parallel-to-serial converter converting the first parallel-form digital luminance signal and the first multiplexed parallel-form digital color-difference signal into a first serial-form digital composite signal;

a second parallel-to-serial converter converting the second parallel-form digital luminance signal and the second multiplexed parallel-form digital color-difference signal into a second serial-form digital composite signal;

a first electric-to-optical converter converting the first serial-form digital composite signal into a first optical signal having a first predetermined wavelength;

a second electric-to-optical converter converting the second serial-form digital composite signal into a second optical signal having a second predetermined wavelength different from the first predetermined wavelength; and an optical multiplexer multiplexing the first optical signal and the second optical signal into a multiplexed optical signal, and outputting the multiplexed optical signal to an optical transmission line.

6. An imaging system as recited in claim 5, further comprising:

an optical demultiplexer receiving the multiplexed optical signal from the optical transmission line, and demultiplexing the multiplexed optical signal into the first optical signal and the second optical signal;

a first optical-to-electric converter converting the first optical signal generated by the optical demultiplexer into the first serial-form digital composite signal;

a second optical-to-electric converter converting the second optical signal generated by the optical demultiplexer into the second serial-form digital composite signal;

a first serial-to-parallel converter converting the first serial-form digital composite signal generated by the first optical-to-electric converter into the first parallel-form digital luminance signal and the first multiplexed parallel-form digital color-difference signal;

a second serial-to-parallel converter converting the second serial-form digital composite signal generated by the second optical-to-electric converter into the second parallel-form digital luminance signal and the second multiplexed parallel-form digital color-difference signal;

a first electric demultiplexer demultiplexing the first multiplexed parallel-form digital color-difference signal generated by the first serial-to-parallel converter into the first and second parallel-form digital color-difference signals;

a second electric demultiplexer demultiplexing the second multiplexed parallel-form digital color-difference signal generated by the second serial-to-parallel converter into the third and fourth parallel-form digital color-difference signals; and a signal combining device multiplexing the first parallel-form digital luminance signal generated by the first serial-to-parallel converter and the second parallel-form digital luminance signal generated by the second serial-to-parallel converter into a multiplexed parallel-form digital luminance signal, multiplexing the first parallel-form digital color-difference signal generated by the first electric demultiplexer and the third parallel-form digital color-difference signal generated by the second electric demultiplexer into a first multiplexed parallel-form digital color-difference signal, and multiplexing the second parallel-form digital color-difference signal generated by the first electric demultiplexer and the fourth parallel-form digital color-difference signal generated by the second electric demultiplexer into a second multiplexed parallel-form digital color-difference signal.

7. An imaging system comprising:

an imager outputting a first analog green signal, a second analog green signal, an analog blue signal, and an analog red signal in a predetermined interlaced-scanning format;

an analog-to-digital converter converting the first analog green signal, the second analog green signal, the analog blue signal, and the analog red signal into a first parallel-form digital green signal, a second parallel-form digital green signal, a parallel-form digital blue signal, and a parallel-form digital red signal, respectively;

a first parallel-to-serial converter converting the first and second parallel-form digital green signals into a serial-form digital green signal;

a second parallel-to-serial converter converting the parallel-form digital blue signal and the parallel-form digital red signal into a serial form digital blue/red signal;

a first electric-to-optical converter converting the serial-form digital green signal into a first optical signal having a first predetermined wavelength;

a second electric-to-optical converter converting the serial-form digital blue/red signal into a second optical signal having a second predetermined wavelength different from the first predetermined wavelength; and an optical multiplexer multiplexing the first optical signal and the second optical signal into a multiplexed optical signal, and outputting the multiplexed optical signal to an optical transmission line.

8. An imaging system as recited in claim 7, further comprising:

an optical demultiplexer receiving the multiplexed optical signal from the optical transmission line, and demultiplexing the multiplexed optical signal into the first optical signal and the second optical signal;

a first optical-to-electric converter converting the first optical signal generated by the optical demultiplexer into the serial-form digital green signal;

a second optical-to-electric converter converting the second optical signal generated by the optical demultiplexer into the serial-form digital blue/red signal;

a first serial-to-parallel converter converting the serial-form digital green signal generated by the first optical-to-electric converter into the first and second parallel-form digital green signals;

a second serial-to-parallel converter converting the serial-form digital blue/red signal generated by the second optical-to-electric converter into the parallel-form digital blue signal and the parallel-form digital red signal;

a signal combining device multiplexing the first and second parallel-form digital green signals generated by the first serial-to-parallel converter into a multiplexed parallel-form digital green signal; and a signal converter converting a set of the multiplexed parallel-form digital green signal, the parallel-form digital blue signal generated by the second serial-to-parallel converter, and the parallel-form digital red signal generated by the second serial-to-parallel converter into a set of a parallel-form digital luminance signal, a first parallel-form digital color-difference signal, and a second parallel-form digital color-difference signal.

9. An imaging system as recited in claim 7, further comprising:

an optical demultiplexer receiving the multiplexed optical signal from the optical transmission line, and demultiplexing the multiplexed optical signal into the first optical signal and the second optical signal;

a first optical-to-electric converter converting the first optical signal generated by the optical demultiplexer into the serial-form digital green signal;

a second optical-to-electric converter converting the second optical signal generated by the optical demultiplexer into the serial-form digital blue/red signal;

a first serial-to-parallel converter converting the serial-form digital green signal generated by the first optical-to-electric converter into the first and second parallel-form digital green signals;

a second serial-to-parallel converter converting the serial-form digital blue/red signal generated by the second optical-to-electric converter into the parallel-form digital blue signal and the parallel-form digital red signal;

a signal converter converting a set of the first and second parallel-form digital green signals generated by the first serial-to-parallel converter, the parallel-form digital blue signal generated by the second serial-to-parallel converter, and the parallel-form digital red signal generated by the second serial-to-parallel converter into a set of a first parallel-form digital luminance signal, a second parallel-form digital luminance signal, a first parallel-form digital color-difference signal, and a second parallel-form digital color-difference signal; and a signal combining device multiplexing the first and second parallel-form digital luminance signals generated by the signal converter into a multiplexed parallel-form digital luminance signal.

10. An imaging system comprising:

an imager outputting an analog green signal, an analog blue signal, and an analog red signal in a predetermined progressive-scanning format;

an analog-to-digital converter converting the analog green signal, the analog blue signal, and the analog red signal into a parallel-form digital green signal, a parallel-form digital blue signal, and a parallel-form digital red signal, respectively;

a signal divider separating the parallel-form digital green signal into first and second sub parallel-form digital green signals, separating the parallel-form digital blue signal into first and second sub parallel-form digital blue signals, and separating the parallel-form digital red signal into first and second sub parallel-form digital red signals;

a first parallel-to-serial converter converting the first and second sub parallel-form digital green signals into a serial-form digital green signal;

a second parallel-to-serial converter converting the first and second sub parallel-form digital blue signals into a serial-form digital blue signal;

a third parallel-to-serial converter converting the first and second sub parallel-form digital red signals into a serial-form digital red signal;

a first electric-to-optical converter converting the serial-form digital green signal into a first optical signal having a first predetermined wavelength;

a second electric-to-optical converter converting the serial-form digital blue signal into a second optical signal having a second predetermined wavelength different from the first predetermined wavelength;

a third electric-to-optical converter converting the serial-form digital red signal into a third optical signal having a third predetermined wavelength different from the first predetermined wavelength and the second predetermined wavelength; and an optical multiplexer multiplexing the first optical signal, the second optical signal, and the third optical signal into a multiplexed optical signal, and outputting the multiplexed optical signal to an optical transmission line.

11. An imaging system as recited in claim 10, further comprising:

an optical demultiplexer receiving the multiplexed optical signal from the optical transmission line, and demultiplexing the multiplexed optical signal into the first optical signal, the second optical signal, and the third optical signal;

a first optical-to-electric converter converting the first optical signal generated by the optical demultiplexer into the serial-form digital green signal;

a second optical-to-electric converter converting the second optical signal generated by the optical demultiplexer into the serial-form digital blue signal;

a third optical-to-electric converter converting the third optical signal generated by the optical demultiplexer into the serial-form digital red signal;

a first serial-to-parallel converter converting the serial-form digital green signal generated by the first optical-to-electric converter into the first and second sub parallel-form digital green signals;

a second serial-to-parallel converter converting the serial-form digital blue signal generated by the second optical-to-electric converter into the first and second sub parallel-form digital blue signals;

a third serial-to-parallel converter converting the serial-form digital red signal generated by the third optical-to-electric converter into the first and second sub parallel-form digital red signals; and a signal combining device multiplexing the first and second sub parallel-form digital green signals generated by the first serial-to-parallel converter into the parallel-form digital green signal, multiplexing the first and second sub parallel-form digital blue signals generated by the second serial-to-parallel converter into the parallel-form digital blue signal, and multiplexing the first and second sub parallel-form digital red signals generated by the third serial-to-parallel converter into the parallel-form digital red signal.

* * * * *

UNITED STATES PATENT AND TRADEMARK OFFICE
CERTIFICATE OF CORRECTION

PATENT NO. : 6,539,109 B1
DATED : March 25, 2003
INVENTOR(S) : Yoichi Hirose

It is certified that error appears in the above-identified patent and that said Letters Patent is hereby corrected as shown below:

<u>Column 26,</u>
Line 46, should read -- signal, and the parallel-form digital red signal into a --

Signed and Sealed this

Twenty-ninth Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,539,109 B1
DATED : March 25, 2003
INVENTOR(S) : Yoichi Hirose

It is certified that error appears in the above-identified patent and that said Letters Patent is hereby corrected as shown below:

<u>Title page,</u>
Item [73], Assignee: delete "Matsushita Electric Industrial, Inc." and insert
-- Matsushita Electric Industrial Co., Ltd. --.

Signed and Sealed this

Second Day of September, 2003

JAMES E. ROGAN
*Director of the United States Patent and Trademark Office*